US006374304B1

(12) United States Patent
Chiashi

(10) Patent No.: US 6,374,304 B1
(45) Date of Patent: *Apr. 16, 2002

(54) DATA COMMUNICATION SYSTEM AND INFORMATION MANAGEMENT APPARATUS HAVING COMMUNICATION FUNCTION ADAPTABLE TO THE SYSTEM

(75) Inventor: Eiji Chiashi, Hamura (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,820

(22) Filed: Feb. 24, 1997

(30) Foreign Application Priority Data

Mar. 1, 1996 (JP) ........................................... 8-044548

(51) Int. Cl.[7] ........................................... G06F 15/16
(52) U.S. Cl. ........................................... 709/246
(58) Field of Search ....................... 395/200.76, 200.66, 395/200.47, 377, 800.25, 800.26; 340/825.44; 364/232.22, 260, 946.2; 455/31.2; 709/246, 217, 237; 712/25, 26, 201

(56) References Cited

U.S. PATENT DOCUMENTS

| | | | | |
|---|---|---|---|---|
| 4,473,824 A | | 9/1984 | Clayor | 340/825.27 |
| 4,486,853 A | | 12/1984 | Parsons | 364/900 |
| 5,038,284 A | | 8/1991 | Kramer | 364/408 |
| 5,493,692 A | * | 2/1996 | Theimer et al. | 455/26.1 |
| 5,606,712 A | | 2/1997 | Hidaka | 395/800 |
| 5,694,119 A | * | 12/1997 | Ono | 340/825.44 |
| 5,740,369 A | * | 4/1998 | Yokozawa et al. | 395/200.47 |
| 5,765,170 A | * | 6/1998 | Morikawa | 707/200 |

OTHER PUBLICATIONS

S. Sheng et al, "A Portable multimedia Terminal", Dec. 1, 1992, pp. 64–75, vol. 30, IEEE Communications Magazine.

* cited by examiner

*Primary Examiner*—Glenton B. Burgess
*Assistant Examiner*—Tod Kupstas
(74) *Attorney, Agent, or Firm*—Frishauf, Holtz, Goodman, Langer & Chick, P.C.

(57) ABSTRACT

The information management apparatus has a RAM for classifying and storing a plurality of data items in accordance with the attribute of data, a receiver for receiving a signal including data and an instruction code specifying the attribute, a decoder, a display portion for displaying received data together with the instruction code, a key input portion for causing data displayed on the display portion to be stored to the corresponding classified position in the RAM and a control unit for causing data to be stored in the corresponding classified position in the RAM in accordance with the instruction operation performed by the key input portion. As a result, the sender can arbitrarily select and transmit data having attribute and the receiver can store data of a type having attribute to a memory region corresponding to the attribute while requiring a simple operation.

22 Claims, 29 Drawing Sheets

PT

| PAGER TYPE | No. |
|---|---|
| KANJI DISPLAY | 1 |
| FREE DIRECT | 2 |
| FREE NUMERAL/KANA | 3 |
| NUMERAL DISPLAY | 4 |

MT

| MODE CODE | | MODE NAME DATA | DISPLAY SYMBOL | NUMBER OF ITEM SWITCHING CODES | | |
|---|---|---|---|---|---|---|
| ] [ | 1 | GROUP TALK |  | | | 2 |
| | 2 | SCHEDULE |  | | | 3 |
| | 3 | ADDRESS BOOK |  | | | 12 |
| | 4 | MEMORANDUM |  | | | 1 |
| | 5 | TO DO |  | "TO DO" IS | ON | 3 |
| | | | | | OFF | 2 |

SD(1A)

| STORAGE ADDRESS | ITEMS | | | | | |
|---|---|---|---|---|---|---|
| | 1 | | | 2 | 3 | 4 |
| | DATE | START TIME | END TIME | CONTENTS OF SCHEDULE | ICON | ALARM TIME |
| 01 | 1996 0329 | 0900 | 1100 | MEETING AT SHINJUKU |  | 08:30 |
| 02 | 1996 0329 | 1300 | 1500 | YOYOGI PARK |  | |
| 03 | 1996 0331 | 1400 | 1700 | IN FRONT OF KANDA STATION | | |
| 04 | 1996 0401 | 1200 | 1400 | MOVIES AT YURAKUCHO | | 11:00 |
| 05 | 1996 0403 | 1600 | 1700 | BARGAIN SALE AT XX DEPARTMENT STORE | | 15:30 |
| ⋮ | ⋮ | ⋮ | ⋮ | ⋮ | ⋮ | ⋮ |

FIG.18

RD (1A)

| STORAGE ADDRESS | CONTENTS OF RECEIVED MESSAGE | CONFIRMATION FLAG |
| --- | --- | --- |
| 0 1 | PLEASE FAX | 1 |
| 0 2 | I WANT TO SEE YOU | 1 |
| 0 3 | CALL AS SOON AS POSSIBLE | 1 |
| 0 4 | I COULD NOT TAKE LAST TRAIN | 1 |
| 0 5 | ] [ 2 19960401120001400 [ ] MOVIES AT YURAKUCHO [ ][ ] 11:00 | 1 |
| ............ | ............ | ............ |

FIG.22

RD (1B)

| STORAGE ADDRESS | CONTENTS OF RECEIVED MESSAGE | CONFIRMATION FLAG |
|---|---|---|
| 05 | ][2 19960401120014OO [] MOVIES AT YURAKUCHO [][] 11:00 | 1 |
| 06 | ][3 KAZUO KATO [] カトウカズオ [] 033-xxx-0000<br>[] 1 [] 03-△△△△-□□□□ [] 3-2-1, SAKAE-CHO,<br>HAMURA-SHI, TOKYO [][][][][][][] | 1 |
| 07 | ][4 SHOPPING LIST ↵ APPLES ↵ NECKTIE [] ☂ | 1 |
| 08 | ][1 "GAME OF GO" COMMUNICATION [] HAMAO YAMADA<br>[] TOMORROW<br>LETS HAVE A DRINK AT TACHIKAWA TOMORROW | 1 |
| 09 | ][5 1 [] SHOPPING AT SHINJUKU [] ☺ [] 19960121<br>2000 | 1 |
| | | |

FIG.23
12(1B)
APRIL 1, 1996
KAZUO KATO
SHOPPING LIST
" GAME OF GO "
COMMUNICATION
SHOPPING AT
SHINJUKU

FIG.24

DB (1A)

| STORAGE ADDRESS | ITEMS | | | | | | | |
|---|---|---|---|---|---|---|---|---|
| | 1 | 2 | 3 | 4 | 5 | 6 | 7 | 8 |
| | NAME | READING | TELEPHONE NUMBER | PAGER TYPE | CALL NUMBER OF PAGER | ADDRESS | ICON | OTHER 1~6 |
| 1 | KAZUO KATO | "KAZUO KATO" | 033-xxx-0000 | KANJI DISPLAY | 03-△△△△ -□□□□ | TACHIKAWA-SHI, TOKYO | | |
| 2 | YOSHIKO KATO | "YOSHIKO KATO" | 0425-△△-xxxx | FREE DIRECT | 03- ○○○○ - x x x x | AKISHIMA-SHI, TOKYO | | |
| ⋮ | ⋮ | ⋮ | ⋮ | ⋮ | ⋮ | ⋮ | ⋮ | ⋮ |

MD (1A)

| STORAGE ADDRESS | ITEMS | |
|---|---|---|
| | 1 | 2 |
| | CONTENTS OF MEMORANDUM | ICON |
| 01 | SHOPPING LIST ↲ APPLES ↲ NECKATIE |  |
| 02 | TIME OF LAST TRAIN ↲ XX-LINE ↲ 12:50 ↲ | |
| 03 | ..................... | ....... |
| .................... | .................... | .................... |

GT(1A)

| STORAGE ADDRESS | ITEM DATA | | |
|---|---|---|---|
| | 1 | 2 | 3 |
| | FILE NAME | SENDER | CONTENTS OF MESSAGE |
| 01 | " GAME OF GO " COMMUNICATION | HAMAO YAMADA | LETS HAVE A DRINK AT TACHIKAWA TOMORROW |
| ⋮ | ⋮ | ⋮ | ⋮ |

TD (1A)

| | ITEMS | | | |
|---|---|---|---|---|
| | 1 | 2 | 3 | 4 |
| | CHECK STATE (FLAG) | TO DO | ICON | CHECK TIME |
| 0 1 | 1 | SHOPPING AT SHINJUKU |  | 19960121 2000 |
| 0 2 | 0 | SHOPPING AT SHIBUYA | | |
| ⋮ | ⋮ | ⋮ | ⋮ | ⋮ |

DATA COMMUNICATION SYSTEM AND INFORMATION MANAGEMENT APPARATUS HAVING COMMUNICATION FUNCTION ADAPTABLE TO THE SYSTEM

BACKGROUND OF THE INVENTION

The present invention relates to a data transmission system and an information management apparatus having a communication function adapted to the system.

This application is based on Japanese Patent Application No. 08-044,548, filed Mar. 1, 1996, the content of which is incorporated herein by reference.

Hitherto, portable information management apparatuses including electronic notebooks and handheld computers, have been known. The portable information management apparatuses are structured such that information of various categories each having different attributes, such as schedule data indicating the schedule of the user, address-book data consisting of a plurality of personal data including names and telephone numbers, are previously input so as to be displayed when required.

In recent years, transmission of data stored in an information management apparatus to another apparatus has been performed by using an existent communication system, for example, a wireless paging system. When data is transmitted from an information management apparatus to a pager receiver by using the wireless paging system, a loudspeaker unit provided for the information management apparatus is applied to the transmitter of a telephone set. In this state, a DTMF (Dual Tone Multiple-Frequency) signal corresponding to the call number (the pager number) of the pager receiver and data, which must be transmitted, is generated from the loudspeaker unit. As a result, a signal for calling the pager receiver and the message signal corresponding to above data are transmitted from a transmission station of the wireless paging system. Thus, data transmitted from the information management apparatus is received by the pager receiver.

If the pager receiver has the information management function as described above, that is, if the pager receiver is an information management apparatus provided with a paging signal receiving function, a function permitting data, such as schedule data and address-book data, to be transmitted and received is expected to make the pager receiver to be a further convenient apparatus as a communication means.

However, the message data, schedule data and address-book data which must be displayed have different attributes because of their different purposes. If data is transmitted or received regardless of the attribute of data, the user of the receiving device must determine the attribute of transmitted data to store the same in a corresponding region in a memory.

BRIEF SUMMARY OF THE INVENTION

Accordingly, it is an object of the present invention to provide an information management apparatus capable of transmitting data of a type having an attribute regardless of the attribute.

It is another object of the present invention to provide an information management apparatus capable of causing data to be stored in a region of a memory corresponding to the attribute of received data without a necessity of performing a complicated operation if the received data has the attribute.

It is still another object of the present invention to provide a data transmission system using the foregoing apparatuses.

According to the present invention, there is provided a communication system comprising:

a first information management apparatus having first storage means for classifying and storing a plurality of data items in accordance with an attribute of the data items, and transmission means for transmitting a signal including data items read from the storage means and an instruction code for specifying the attribute of the data items; and second information management apparatus having second storage means structured similarly to the first storage means, receiving means for receiving a signal transmitted from the first information management apparatus, display means for displaying data included in the signal received by the receiving means together with the instruction code, instruction means for performing an instruction operation for storing the data displayed on the display means to a corresponding classification position in the second storage means in accordance with the instruction code received by the receiving means, and storage control means for storing data to the corresponding classification position in the second storage means in accordance with the instruction operation performed by the instruction means.

The above-mentioned communication system enables the receiver-side apparatus to store data transmitted from the transmission apparatus in a classified region on the storage means corresponding to the attribute of data with a simple instruction operation so as to share data.

According to another aspect of the present invention, there is provided an information management apparatus comprising:

storage means for classifying and storing a plurality of data items in accordance with an attribute of the data items; and transmission means for transmitting a signal including data items read from the storage means and an instruction code for specifying the attribute of the data items.

According to this information management apparatus, user of this information management apparatus is able to transmit data of a type having an attribute regardless of the attribute.

According to still further aspect of the present invention, there is provided an information management apparatus comprising:

storage means for classifying and storing a plurality of data items in accordance with an attribute of the data items;

selection means for selecting data item to be transmitted from the plurality of data items stored in the storage means; and transmission means for reading data item selected by the selection means from the storage means and transmitting a signal including data item read from the storage means and an instruction code for specifying the attribute of read data.

According to still further aspect of the present invention, the transmission means converts, into a dial tone signal, the signal including data and the instruction code so as to sequentially transmit the signal.

According to still further aspect of the present invention, there is provided an information management apparatus comprising:

storage means for classifying and storing a plurality of data items in accordance with an attribute of the data items;

receiving means for receiving a signal including data and an instruction code for specifying the attribute of data;

display means for displaying data included in the signal received by the receiving means together with the instruction code;

instruction means for performing an instruction operation for storing the data displayed on the display means to a corresponding classification position in the storage means in accordance with the instruction code received by the receiving means; and storage control means for storing data to the corresponding classification position in the storage means in accordance with the instruction operation performed by the instruction means.

According to this information management apparatus, received data can be stored in a classified region on the storage means corresponding to the attribute of data with a simple instruction operation for confirming received data.

According to still further aspect of the present invention, there is provided an information management apparatus comprising:

storage means for classifying and storing a plurality of data items in accordance with an attribute of the data items;

receiving means for receiving a signal including data and an instruction code for specifying the attribute of data;

display means for displaying data included in the signal received by the receiving means together with the instruction code;

instruction means for performing an instruction operation for storing the data displayed on the display means to a corresponding classification position in the storage means in accordance with the instruction code received by the receiving means;

storage control means for storing data to the corresponding classification position in the storage means in accordance with the instruction operation performed by the instruction means; and transmission means for transmitting a signal including data read from said storage means and an instruction code for specifying the attribute of read data.

According to the still further aspect of the present invention, the transmission means converts, into a dial signal, the signal including data and the instruction code so as to sequentially transmit the signal.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 18 is a diagram showing the contents stored in the received message data memory RD shown in FIG. 8;

FIG. 22 is a diagram showing the contents stored in the received message data memory RD shown in FIG. 8;

FIG. 24 is a diagram showing the contents stored in the address-book data memory DB shown in FIG. 8;

DETAILED DESCRIPTION OF THE INVENTION

A preferred embodiment of a data transmission system using a wireless paging system according to the present invention will now be described with reference to the accompanying drawings.

Figure 1:
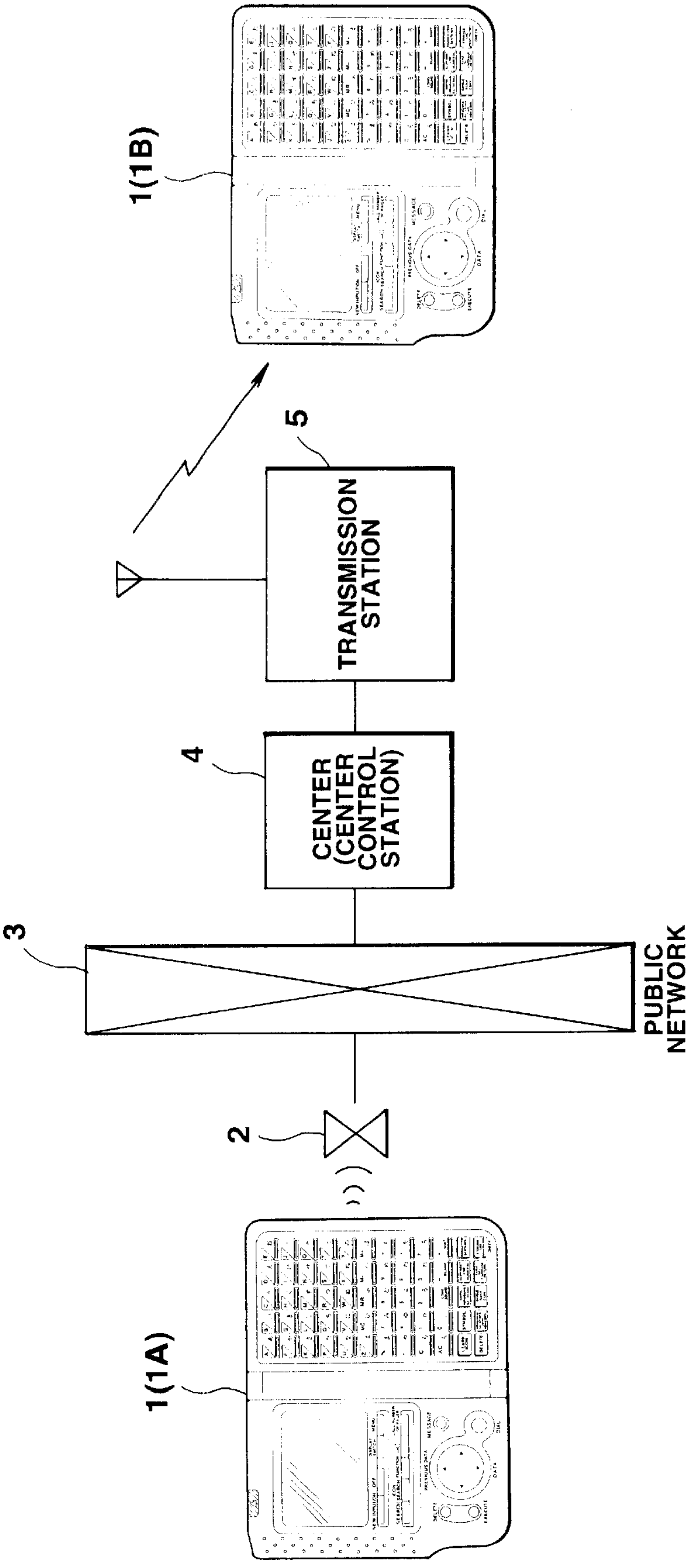
FIG. 1 is a diagram showing the overall structure of a system according to an embodiment of the present invention.

FIG. 1 is a diagram showing the structure of the wireless paging system using information management apparatuses 1A and 1B according to the present invention as a data transmission terminal and a data receiving terminal. The information management apparatus 1 is an electronic notebook having a dial tone output function and a paging signal receiving as a push-phone telephone set, is connected to a center (a central control station) 4 administrated by a paging service. A transmission station 5 is connected to the center 4. When a predetermined call number is, in the form of a dial signal, for example, a DTMF (Dual Tone Multiple-Frequency: dial tone) signal, is transmitted from, for example, an electronic notebook 1A through th e telephone terminal 2, another electronic notebook 1B having a structure similar to that of the electronic notebook 1A and corresponding to the call number is called through the public network 3, to which the telephone terminal 2 is connected, the center 4 administrated by the paging service and the transmission station 5.

Figure 2:
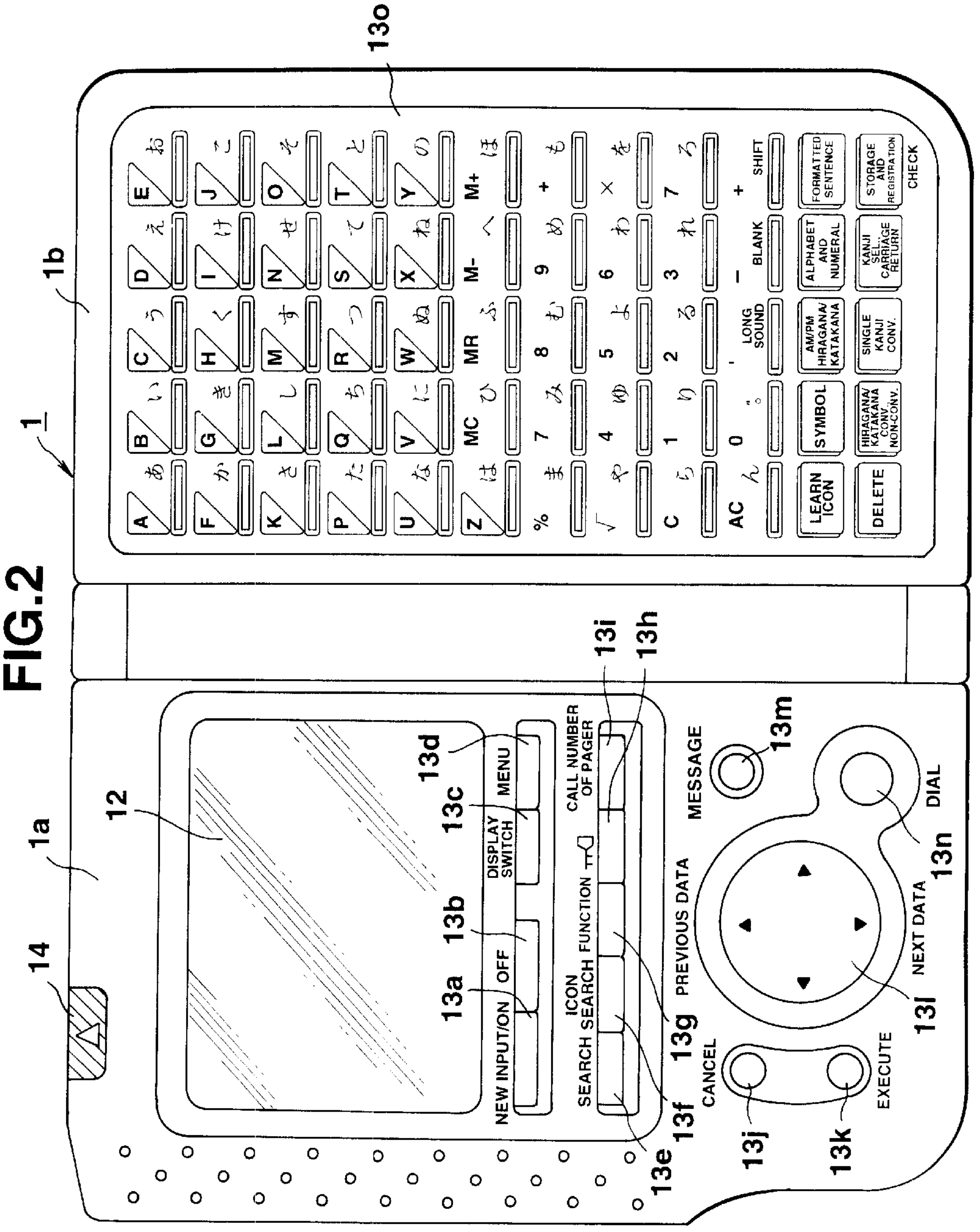
FIG. 2 is a front view showing the shape of the electronic notebook shown in FIG. 1.
Figure 3:
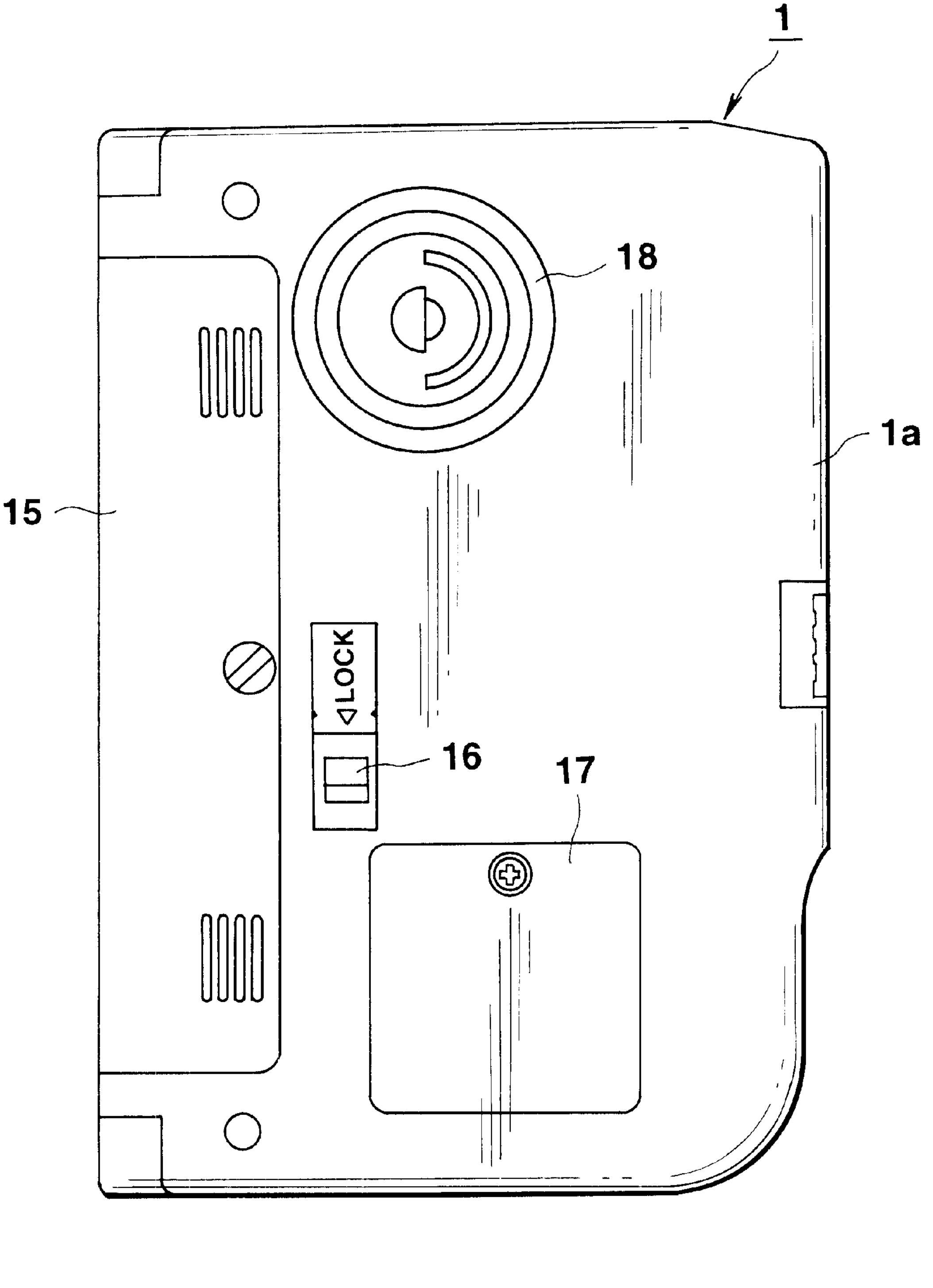
FIG. 3 is a back view showing the shape of the electronic notebook shown in FIG. 1.

FIGS. 2 and 3 are diagrams showing th e shape of the electronic notebook 1 (1A and 1B). FIG. 2 is a front view showing an opened electronic notebook 1 having a shape like a notebook, and FIG. 3 is a diagram showing a state where the electronic notebook 1 is closed.

Referring to FIG. 2, the electronic notebook 1 has, on the inner surface of the left-hand side thereof in an opened state, a display portion 12 comprising a dot-matrix type liquid crystal display panel, a display-on key 13*a*, a display-off key 13*b*, a display switch key 13*c*, a menu key 13*d*, a search key 13*e*, an icon search key 13*f*, a function key 13*g*, a secret key 13*h*, a call number key 13*i*, an execute key 13*k*, a cursor key 13*l*, a the message key 13*m* and a dial key 13*n*. Moreover, an IR transmitting/receiver 14, a connector 15 and a pager power supply switch 16 are disposed on the top end of the electronic notebook 1.

The display-on key 13*a* is a key for turning on the function of the electronic notebook and, in a case where the function of the electronic notebook has been turned on, for shifting the state of the electronic notebook 1 to a state where data is newly input. The display-off key 13*b* is a key for turning off the function of the electronic notebook 1 to turn off the display.

The display switch key 13*c* is a key for switching the display, while the menu key 13*d* is a key for shifting the mode for displaying a menu of all modes provided for the electronic notebook 1.

The search key 13*e* is a key for instructing data search or cancellation of the data search. The icon search key 13*f* is a key for searching data for each icon or cancellation of the searching operation.

The call number key 13*i* is a key for displaying data registered in the telephone directory mode, that is, a list of only the call number, the type and name of the owner of the pager receiver from an address-book data memory DB, to be described later.

The cancel key 13*j* is a key for canceling the function or the operation, which is being performed, or the "kana-kanji" conversion. The execute key 13*k* is a key for instructing execution of the selected function.

The cursor key 13*l* is a key for instructing the movement of the cursor into the upward, downward, rightward and leftward directions, the cursor being displayed in various forms corresponding to the selected states, such as a menu display mode, a file selection display mode, date selection display mode, a character edition display mode and so forth. By using the cursor key 13*l* together with a sheet key 13*o*, to be described later, display of data display previously or next data can be instructed.

The message key 13*m* is a key for shifting the state of display of a received message stored in a received message data memory RD, to be described later. The dial key 13*n* is a key for instructing to start transmitting the dial signal indicating the telephone number and data, for example, the DTMF signal.

The IR transmitting/receiver 14 has a structure such that an infrared light emission portion and an infrared light receiver are formed integrally to directly transmit/receive various data items to and from another electronic notebook 1 having a similar structure.

A sheet key 13*o* is disposed on the inner surface of the right-hand side 1*b* of the electronic notebook 1, the sheet key 13*o* having a multiplicity of "kana" keys, alphabet keys, numeral keys, symbol keys and various function keys disposed in an overlap manner. By using the sheet key 13*o*, input and instruction can be performed such that data is input, edited, converted and registered, the calculator function is used and a the message is protected.

A connector (not shown) is formed in the side surface of the left-hand side 1*a* of the electronic notebook 1, the connector being, through an electric line, connected to another electronic notebook 1 having a similar structure so as to transmit/receive various data items.

FIG. 3 is a diagram showing a state where the electronic notebook 1 is closed and the shape of the reverse side of the left-hand side 1*a* shown in FIG. 2. As shown in FIG. 3, the reverse side of the electronic notebook 1 has a battery cover 15 for accommodating, for example, four size-AAA-batteries serving as a power source for operating the electronic notebook 1, a lock switch 16 for preventing unintentional opening of the battery cover 15, a backup battery cover 17 for accommodating a backup button battery for saving the contents of the memory individually from the batteries accommodated in the battery cover 15, and a loudspeaker unit 18 for outputting the DTMF signal and the like.

Figure 4:
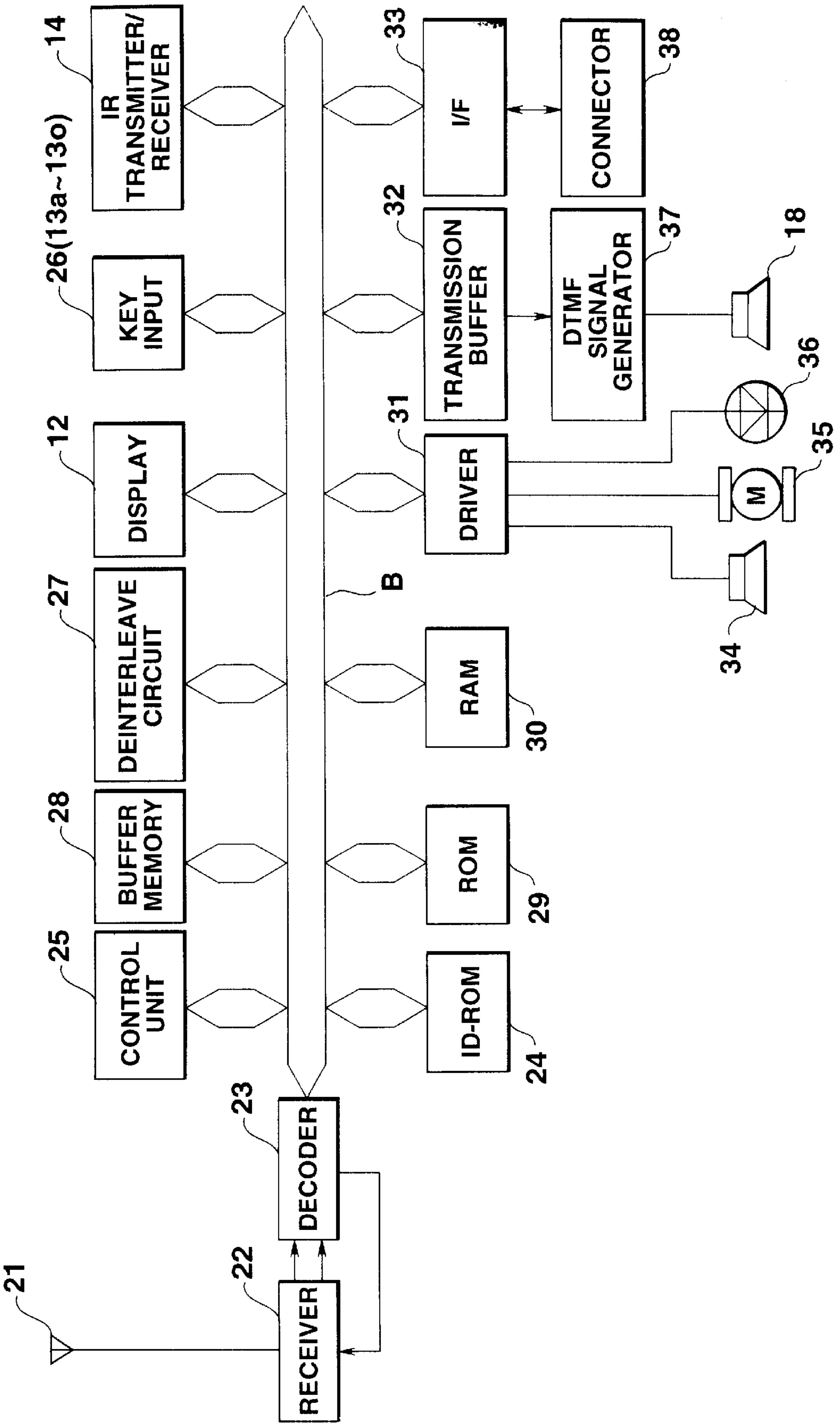
FIG. 4 is a block diagram of a circuit in the electronic notebook shown in FIG. 1.

FIG. 4 shows the structure of a circuit provided in the electronic notebook 1 (1A and 1B). Radio waves for calling the electronic notebook 1 are received by an antenna 21 so as to be supplied to the receiver 22. The receiver 22 demodulates data received by the antenna 21 into binary or quadruple digital data to transmit the same to a decoder 23.

When the decoder 23 has detected power supply, the decoder 23 operate the receiver 22 under control of a control unit 25 connected through a bus line B until a synchronizing signal is received within a predetermined time. When the decoder 23 has detected the synchronizing signal, the decoder 23 intermittently operates the receiver 22 in accordance with a control signal supplied from the control unit 25 which has fetched frame number data stored in an ID-ROM 24.

Then, the decoder 23 converts the signal demodulated by the receiver 22 into an 8-bit parallel data to transmit it to the control unit 25. When the decoder 23 has received, from the control unit 25, a signal indicating a determination that the 8-bit parallel data coincides with address data of the ID code set to the own electronic notebook 1, the decoder 23 transmits, to the control unit 25, vector data and the message data, which are received next.

The control unit 25 is, through the bus line B, connected to the decoder 23, the ID-ROM 24, the IR transmitting/receiver 14, a key input portion 26, the display portion 12, a deinterleave circuit 27, a buffer memory 28, a ROM 29, a RAM 30, a driver 31, a transmission buffer 32 and an interface (IF) 33. In accordance with the operation program stored in the ROM 29, the control unit 25 controls the receiving operation of the decoder 23 and the overall operation of the circuit.

The deinterleave circuit 27 is, under control of the control unit 25, suspends the interleaving process to which received data, that is, received data in a digital value decoded by the decoder 23 is being subjected so as to restore the same to the original code arrangement.

The buffer memory 28 temporarily stores received data directly supplied from the decoder 23 to supply the same to the deinterleave circuit 27.

Figures 5, 6:
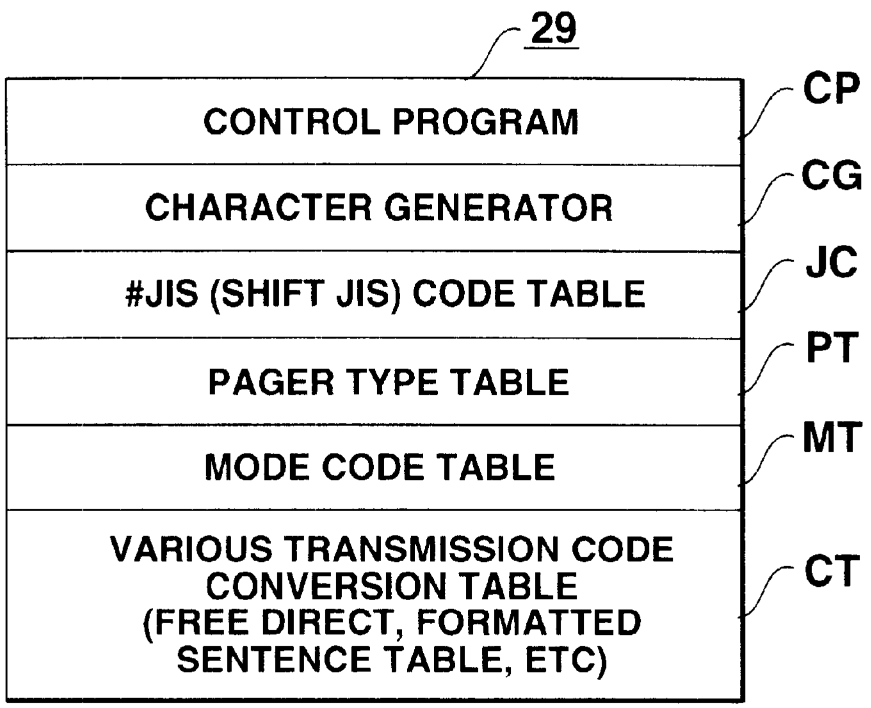
FIG. 5 is a diagram showing the memory region configuration in a ROM 29 shown in FIG. 4.
FIG. 6 is a diagram showing the contents of a type table PT of pager receiver shown in FIG. 5.

FIG. 5 is a diagram showing an example of a region for various information items stored in the ROM 29, the ROM 29 having regions for a control program CP for the control unit 25, character generator CG for storing pattern data of various characters including, numerals, symbols, alphabets, "hiragana", "katakana", "kanji" and icons to be displayed on the display portion 12, #(shift)JIS code table JC for converting "kanji", "katakana", "hiragana", capital and small letters of alphabets, symbols and icons into a form as "#OOOO", pager receiver type table PT indicating, with numbers, the types of pager receivers, mode code table MT storing mode name data and the like corresponding to the code of the operation mode, and various transmission code conversion table CT corresponding to the type of the pager receiver.

FIG. 6 is a diagram showing the contents stored in the pager receiver type table PT in which "kanji display" type pager receivers each of which is capable of displaying "kanji" and the like to correspond to the #JIS code are classified as "1", "free direct" type pager receivers each of which conforms to RCR STD-43 are classified as "2", "free numerals/kana" type pager receivers are classified as "3" and "numeral display" type pager receivers are classified as "4".

Figure 7:
FIG. 7 is a diagram showing the contents of the mode code table MT shown in FIG. 5.
Figure 7:
Figure 7:
Figure 7:
Figure 7:

FIG. 7 is a diagram showing the contents stored in the mode code table MT in which "mode codes", "mode name data", "display symbols" and "number of codes for switching the item" corresponding to five modes of ten modes of the electronic notebook function are stored, that is, "group talk" mode, "schedule" mode, "address book" mode, "memorandum" mode and "To Do" mode are stored.

Among the foregoing modes, the mode code is in the form as "][1" if the mode is the group talk mode. That is, symbol "][" is provided for the leading end of the code, the symbols "][" being converted into #JIS code such that symbol "]" is converted into "0147" and symbol "[" is converted into "0146". When the transmission operation is performed, the overall mode code is formed into nine-digit code data.

The number of codes for switching the item indicates the number of codes for switching the item which is inserted into one transmission data item. The code for switching the item is indicated by "[ ]". When foregoing symbol is converted into a free direct code conforming to RCR STD-43, the foregoing symbol is in the form as "*4*6".

Figure 8:
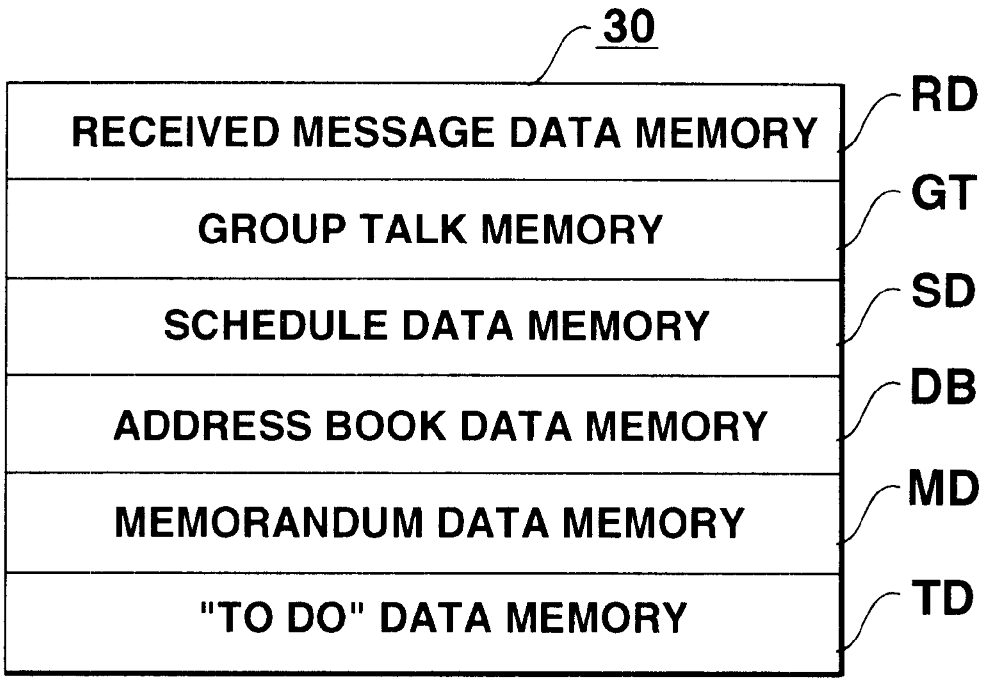
FIG. 8 is a diagram showing the memory region configuration in a RAM 30 shown in FIG. 4.

FIG. 8 is a diagram showing storage regions of the RAM 30. As shown in FIG. 8, the RAM 30 has storage regions for a received message data memory RD for sequentially storing received message data suspended from the interleave process in the deinterleave circuit 27, a group talk memory GT for storing data, which is transmitted/received between groups and which is used in the "group talk" mode, a schedule data memory SD to be described later, an address-book data memory DB for storing names and telephone numbers of a plurality of persons, the number and the type of the pager receiver of the user and address, a memorandum data memory MD for storing memorandum data and "To Do" data memory TD for storing "To Do" data indicating important event which must be performed.

Figure 9:
FIG. 9 is a diagram showing an example of the contents stored in the schedule data memory SD shown in FIG. 8.
Figure 9:

FIG. 9 is a diagram showing an example of the contents stored in the schedule data memory SD of the RAM 30 of the electronic notebook 1A arranged to transmit the message data and shown in FIG. 1. Schedule data is formed into a set consisting of a first item including date, start time (minute and hour) and end time (minute and hour), a second item including the contents of the schedule, a third item including an icon and a fourth item including alarm set time (minute and hour). A plurality of sets of schedule data are given storage addresses, and then stored in accordance with the order of the contents in the first item.

The driver 31 is connected to a loudspeaker unit 34, a vibrator 35 and an LED 36 so as to selectively operate the connected units in accordance with the determined contents so as to notify receipt of a the message with a buzzer sound, vibrations or flickering of light.

The transmission buffer 32 sequentially stores digital DTMF signals formed on the basis of transmission data produced by the control unit 25 so as to transmit the same to a D/A converter 37. The D/A converter 37 converts the DTMF signal into an analog signal to operate the loudspeaker unit 18 provided on the reverse side of the electronic notebook 1. Thus, a DTMF signal formed by combining two predetermined audible frequency signals are emitted as a sound.

The interface 33 is provided to directly transmit/receive data to and from another electronic notebook 1 through the connector 38 disposed on the side surface of the electronic notebook 1 (not shown in FIGS. 2 and 3) and an electric line connected to the other electronic notebook 1.

The operation of this embodiment will now be described.

An operation will now be described in which schedule data stored by the transmission-side electronic notebook 1A shown in FIG. 1 is selected so as to be transmitted. The electronic notebook 1B, which has received schedule data through the telephone terminal 2, the public network 3 and the center 4 confirms the contents of schedule data and then stores the same into a predetermined memory region.

Figure 10:
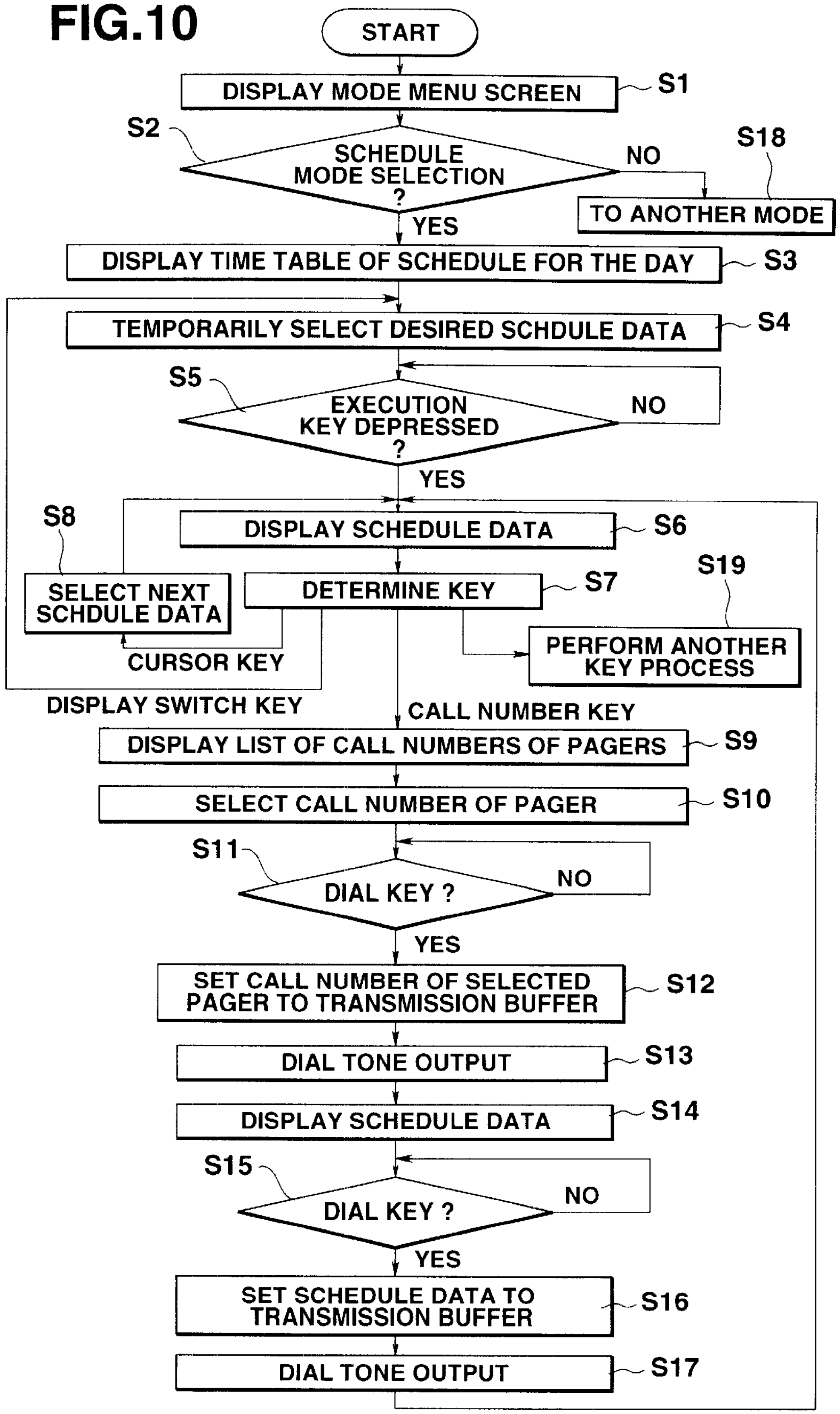
FIG. 10 is a flow chart showing an operation for transmitting schedule data according to the embodiment of the present invention.

FIG. 10 is a diagram mainly showing an operation of the control unit 25 when it transmits schedule data in the transmission mode. Initially, the mode menu screen is displayed on the display portion 12 (step S1). The mode menu screen is displayed when the display-on key 13*a* has been depressed in a state where the power supply is turned off or when the menu key 13*d* has been depressed.

Figure 11:
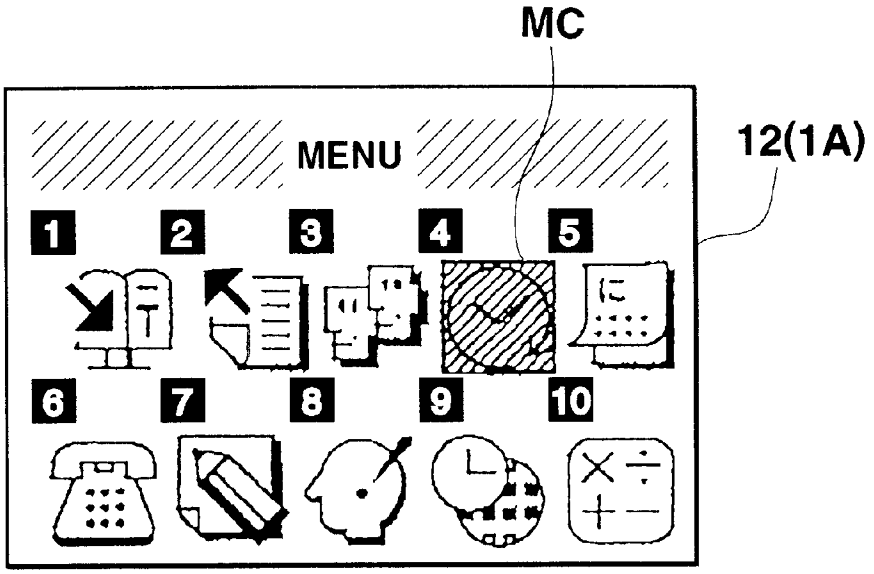
FIG. 11 is a diagram showing an example of a mode menu screen according to the embodiment of the present invention.

FIG. 11 is a diagram showing the mode menu screen on the display portion 12 at this time. Referring to FIG. 11, a mode indicated by numeral "1" and an icon in the form of a mail box having an arrow facing the inside portion of the mail box is the "received message display mode" in which the message data stored in the received message data memory RD can be displayed. A mode indicated by numeral "2" and an icon in the form of a letter paper having an arrow facing outside from the letter paper is a "the message generation mode" in which the message data, required to be transmitted, can be generated to be adaptable to the type of the receiving-side pager receiver. A mode indicated by numeral "3" and an icon in the form of the faces of two persons is a "group talk mode" in which the messages stored in the group talk memory GT and transmitted/received to and from (one or plural) specific persons can be displayed or a new the message, required to be transmitted to a specific person, can be input. A mode indicated by numeral "4" and an icon in the form of a clock having a surrounding arrow is a "schedule mode" in which schedule data stored in the schedule data memory SD can be displayed and new schedule data can be registered to the schedule data memory SD. A mode indicated by numeral "5" and an icon in the form of a calendar is a "calendar mode" in which a calendar sheet of each month can be displayed. A mode indicated by numeral "6" and an icon in the form of a telephone set is an "address book mode" in which address data of plural persons stored in the address-book data memory DB, that is, telephone numbers and addresses can be displayed or new address data can be registered to the address-book data memory DB. A mode indicated by numeral "7" and an icon in the form of a memorandum sheet and a pencil is a "memorandum mode" in which memorandum data stored in the memorandum data memory MD can be displayed or new memorandum data can be stored in the memorandum data memory MD. A mode indicated by numeral "8" and an icon in the form of the head of a person and an exclamation mark is a ""To Do" mode" in which events stored in the "To Do" data memory TD and which must be performed can be displayed or a new event which must be performed can be registered to the "To Do" data memory TD. A mode indicated by numeral "9" and an icon in the form of a clock and a shadow overlapping the clock is a "clock mode" in which the present date or time can be displayed or modified. A mode indicated by numeral "10" and symbols of four rules of arithmetic is a "calculator mode" in which a calculation can be performed.

Then, the "schedule mode" is selected. The selection of the "schedule mode" can be performed by operating the cursor key 13*l* in the state where the mode menu screen is displayed, and then the menu cursor MC is shifted to a position of an icon indicating the "schedule mode", as shown in FIG. 11. Then, the execute key 13*k* is required to be depressed. When the execute key 13*k* is operated in a state where the icon indicating the "schedule mode" has been brought to an inverted screen by the menu cursor MC, the control unit 25 determines that a mode selection for displaying schedule data stored in the schedule data memory SD of the RAM 30 has been instructed so that the control unit 25 reads all of schedule data items of the day from the schedule data memory SD and causes a time table corresponding to the set time zone to be displayed on the display portion 12 (step S3).

Figure 12:
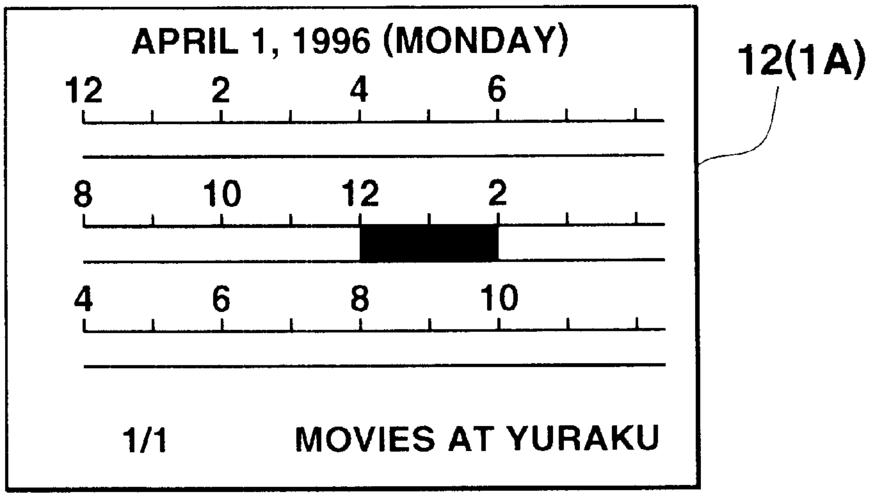
FIG. 12 is a diagram showing a screen when schedule data is transmitted from the apparatus according to the embodiment of the present invention.

If today is Apr. 1, 1996, only schedule data "Movies at Yurakucho at 12:00 to 14:00 (alarm has been set to 11:00)" is read as schedule data for "Apr. 1 (Monday), 1996" stored at storage address "4" in accordance with the contents stored in the schedule data memory SD shown in FIG. 9. Then, the foregoing time zone is displayed on the time table. A time zone, which coincides with the present time, (a time zone nearest the present time if no time zone coincides) is displayed expressly by flickering the same. Moreover, information indicating the order of the schedule among schedules set in the day and the leading end of data indicating the contents of the schedule are displayed. FIG. 12 is a diagram showing an example of the display.

In this case, the cursor key 13*l* is not required to be operated because only one schedule data item is set for the day. If a plurality of schedule data items are set, the cursor key 13*l* is moved to the right or left to sequentially switch the time zones on the time table which are flickered. Moreover, also data of the leading end of the contents of the schedule to be displayed is switched to the corresponding to the contents.

If desired schedule date is not set for today, the cursor key 13*l* is operated vertically to display a time table for schedules for the ensuing days. Then, a similar operation is performed. Thus, desired schedule date is temporarily selected (step S4).

Then, whether or not the execute key 13*k* has been operated is determined (step S5). If a determination has been performed that the execute key 13*k* has been operated, selected schedule data is displayed on the display portion 12 in place of displaying the foregoing time table (step S6).

Figure 13:
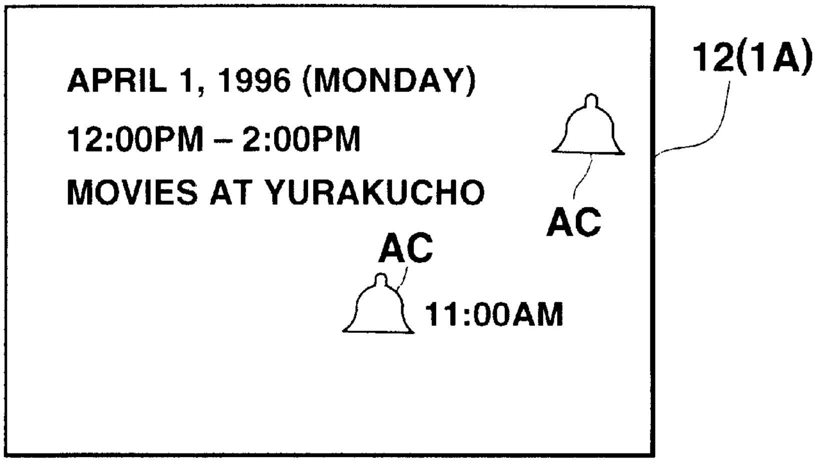
FIG. 13 is a diagram showing a screen when schedule data is transmitted from the apparatus according to the embodiment of the present invention.

FIG. 13 is a diagram showing an example of the above-mentioned state. As shown in FIG. 13, facts that "Movies at Yurakucho" has been set as schedule data for "12:00 PM to 14:00 PM" for "Apr. 1 (Monday), 1996, and alarm has been set to "11:00 AM" are displayed with two bell-shape icons AC.

In a state where the selected schedule data has been displayed on the display portion 12, it is determined which key is operated (step S7). If the cursor key 13*l* has been operated, next schedule data is selected in step S8, and then the operation returns to step S6 so that next schedule data is displayed. If the display switch key 13*c* has been operated, the operation returns to step S4 so that the original time table is displayed. If the call number key 13*i* has been operated, call numbers, types and names of owners of pager receivers are read from address data stored in the address-book data memory DB of the RAM 30 to display a list on the display portion 12 (step S9). Then, the cursor key 13*l* is operated to select a call number of the destined apparatus to which selected schedule data must be transmitted (step S10).

If the dial key 13*n* is operated in the above-mentioned state (step S11), the call number of the selected pager receiver is read from the address-book data memory DB so as to be set to the transmission buffer 32 (step S12) as data to be transmitted. Then, the call number of the pager receiver set to the transmission buffer 32 is supplied to the DTMF signal generating portion 37 so that dial tone corresponding to the call number of the pager receiver is output from the loudspeaker unit 18 (step S13). Note the loudspeaker unit 18 disposed on the reverse side of the electronic notebook 1A must be brought into contact with the transmitter of an arbitrary telephone terminal 2 when the dial key 13*n* is operated.

After the call number of the receiving side apparatus has been transmitted as described above, schedule data selected in step S10 is again displayed on the display portion 12 (step S14).

When the paging service center 4 has received the call number of the pager receiver, it outputs a response announcement, for example, "Please input a the message" to the calling-side telephone terminal 2 through the public network 3. The owner of the electronic notebook 1A confirms the response announcement from the center 4, and then applying the loudspeaker unit 18 to the transmitter of the telephone terminal 2 to operate the dial key 13*n* (step S15).

When the dial key 13*n* has been operated, original data of schedule data displayed on the display portion 12 is read from the schedule data memory SD to set the same to the transmission buffer 32. In this case, the mode code read from the mode code table MT of the ROM 29 is inserted into the leading end of schedule data. Moreover, code for switching the item is inserted for each item. Then, each data, such as characters, symbols and icons in data are converted into four-digit numeral data which is, as data to be transmitted, set to the transmission buffer 32 (step S16).

In an example case where schedule data, which must be transmitted, is schedule shown in FIG. 13, data which is transmitted from the paging center 4 to the receiving-side electronic notebook 1B through the transmission station 5 is in the form as "] [21996040112001400 [ ] Movies at Yurakucho [ ] [ ] 1100". However, data, which must be set to the transmission buffer 32, that is, data required to transmit data to the paging center 4 in the form of a DTMF signal is as follows:

Leading data "] [2" is a mode code indicating schedule also described with reference to FIG. 7. Data is set to the transmission buffer 32 as data of 9 (4 digits×2 characters+one numeral) digits in accordance with the #JIS code.

Data of the first item of the schedule data, that is, "1996040112001400" indicating date, start time and end time is allowed to remain to be numerals and set to the transmission buffer 32 as numeral data of 12 digits.

The item switch code "[ ]" is set to the transmission buffer 32 as 8 (4 digits×2 characters) digit numeral data in accordance with the #JIS code.

Data of the second item following the item switch code "[ ]", that is, the schedule contents "Movies at Yurakucho" is set to the transmission buffer 32 as (4 digits×17 characters) digit numeral data in accordance with the #JIS code.

Since no data exists corresponding to the icon in the third item following data in the second item, item switch code "[ ]" is added twice so as to be set to the transmission buffer 32 as numeral data for 16 digits. Then, data "1100" indicating the alarm time in the fourth item is allowed to remain to be four digit numeral data when set to the transmission buffer 32.

After data generated from schedule data and required to be transmitted has been set to the transmission buffer 32, data is converted into a DTMF signal by the DTMF signal generating portion 37 in step S17 so as to be output to the loudspeaker unit 18. Thus, dial tone corresponding to data to be transmitted is output from the loudspeaker unit 18 as sound.

At this time, the control unit 25 stores all digits of data stored in the transmission buffer 32 and counts the number of remaining digits of data supplied from the transmission buffer 32 to be output from the loudspeaker unit 18 through the DTMF signal generating portion 37 as sound. Thus, the control unit 25 calculates time required to transmit residual data, specifically, number of seconds in accordance with a predetermined transmission rate to display the number of seconds on the display portion 12.

Figure 14:
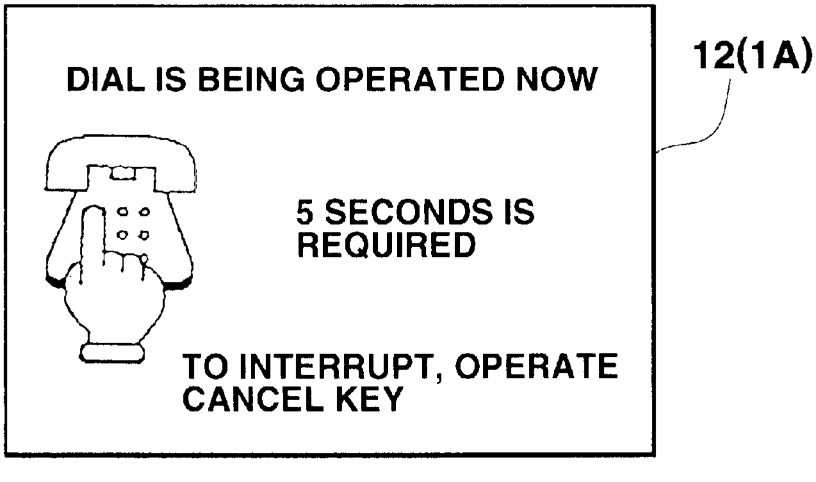
FIG. 14 is a diagram showing a screen when a transmission operation is performed by the apparatus according to the embodiment of the present invention.

FIG. 14 is a diagram showing an example of display on the display portion 12. Characters as "Dialing is being Performed", an icon of a telephone set which is being dialed by the finger and the residual number of seconds, for example, "five seconds are required", are displayed. Moreover, a guide message for interrupting the transmission is displayed as "To Interrupt, Operate Cancel Key".

Display of the residual number of seconds is continuously updated at a predetermined interval, for example, every second to decreases the display count. Then, when the residual number of seconds has been made to be "0", it is determined that all of data items have been transmitted. Thus, for example, characters "Transmission Completed" are displayed on the display portion 12 in place of the display shown in FIG. 14. Thus, the foregoing sequential operations shown in FIG. 10 are temporarily completed. Moreover, in order to transmit schedule data to another apparatus, the process from step S6 is repeatedly performed.

If it is determined that a mode except the schedule mode has been selected from the mode menu screen in step S2, a process corresponding to the selected mode is performed as described later (step S18). If it is determined in step S7 that the operated key is a key except the cursor key 13*l*, the display switch key 13*c* and the call number key 13*i*, the process corresponding to the operated key is performed (step S19).

Next, the operation of the electronic notebook 1B for receiving schedule data transmitted from the electronic notebook 1A will now be described.

Initially, the operation conforming to RCR STD-43 common to the electronic notebook 1 (1A and 1B) and arranged to be performed from a state for waiting receipt immediately after electric power has been supplied to a state for performing the receiving operation will now be described.

When the power supply has been turned on by operating the display-on key 13*a* or the like, an initial operation is performed such that an ID code consisting of the frame number given to the own apparatus and the address code is read from the ID-ROM 24 to set the same to a buffer (not shown) in the control unit 25.

Figure 37:
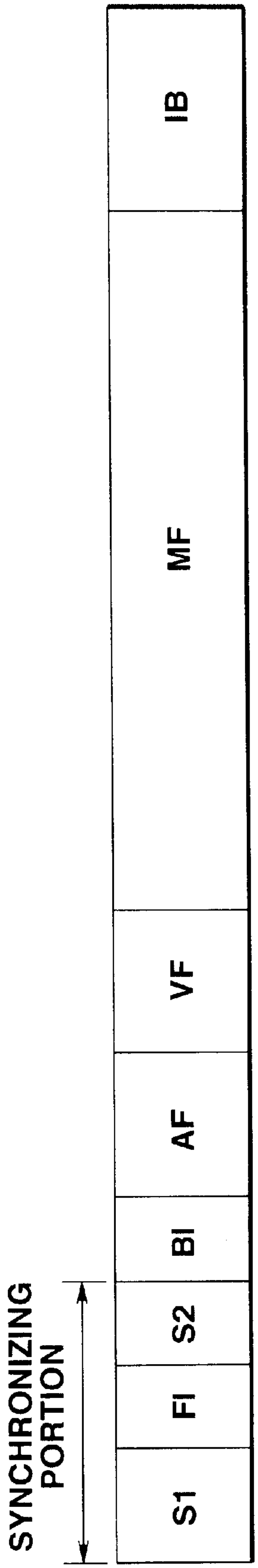
FIG. 37 is a diagram showing the data format of one frame in RCR STD-43.

The decoder 23 receives a synchronizing signal among transmission data which has been transmitted in the frame format shown in FIG. 37, the synchronizing signal being composed of a synchronizing portion 1 (S1), frame information (F1) and synchronizing portion 2 (S2). Thus, the synchronization of the own frame can be established. Since information included in the synchronizing portion 1 (S1) includes four types of frame data, that is, data for setting any one of 1600 bps/binary, 3200 bps/binary, 1600 bps/quadruple and 3200 bps/quadruple, control data is transmitted from the control unit 25 to perform initial setting to be adaptable to any one the four types of frame data.

Then, the decoder 23 performs an initial operation such that the decoder 23 continuously performs the receiving operation until it receives a synchronizing signal composed of the synchronizing portion 1 (S1), the frame information (F1) and the synchronizing portion 2 (S2) regardless of whether the frame is not the own frame. If the decoder 23 receives the synchronizing signal, it converts data in the synchronizing portion 1 (S1) into 8-bit parallel data to supply the same to the control unit 25. At this time, the synchronizing signal is always transmitted as 1600 bps/binary.

The control unit 25 is controlled in accordance with data of the frame type of the synchronizing portion 1 (S1) supplied from the decoder 23. The electronic notebook 1 transmits bit timing data to the receiver 22 through the decoder 23.

In accordance with the bit timing signal supplied from the control unit 25, the decoder 23 arranges the bit timing with the synchronizing portion 2 (S2) to control the receiver 22. Thus, the receiver 22 detects and demodulates the output from the antenna 21 to transmit a binary signal or a quadruple signal to the decoder 23.

Then, the decoder 23 converts data of frame information (F1) into 8-bit parallel data to supply the same to the control unit 25.

The control unit 25 transmits frame timing data to the receiver 22 through the decoder 23 on the basis of data of the frame information (F1). Moreover, the control unit 25 determines whether or not the frame is the own frame. If frame information (F1) coincides with the frame number data in the ID-RON 24, the control unit 25 controls the receiver 22 to continuously perform the receiving operation. If the frame information (F1) does not coincide with the frame number data, the control unit 25 interrupts the receiver 22 and the decoder 23 to the frame immediately before the own frame.

When the control unit 25 has determined that received data is the own frame or immediately before the own frame, the control unit 25 restarts the receiver 22 and the decoder 23 to cause the synchronizing signal of the own frame to be again acquired.

In accordance with bit timing data supplied from the control unit 25, the decoder 23 arranges the bit timing with the synchronizing portion 2 (S2). Then, the decoder 23 converts block information (B1) and address field (AF) of the binary or quadruple signal into 8-bit parallel data to transmit the same to the control unit 25 until an interruption signal is supplied from the control unit 25.

If the transmission type of received data converted into 8-bit parallel data as a result of the process performed by the decoder 23 is any one of three types except 1600 bps/binary, the control unit 25 transmits 8-bit data to the deinterleave circuit 27 so as to rearrange the same into 8-bit data which has been set to the foregoing method to correspond to the respective transmission types. Then, the control unit 25 stores 8-bit data in the buffer memory 28.

When received data (to data of address field (AF)) for one block has been stored in the buffer memory 28, the control unit 25 reads data from the buffer memory 28 to perform determine whether or not data coincides with address code data stored in the ID-ROM 24. In accordance with, a result of the determination, a fact that the own apparatus is called is confirmed to determine whether the receiving operation is to be continued or the receiving operation is to be interrupted to next frame timing.

If it is determined that the own apparatus is being called and the receiving operation is to be continued, a receiving operation is performed to sequentially receive data in a vector field (VF), a the message field (MF) and an idle block (IB) following the call number.

Figure 15:
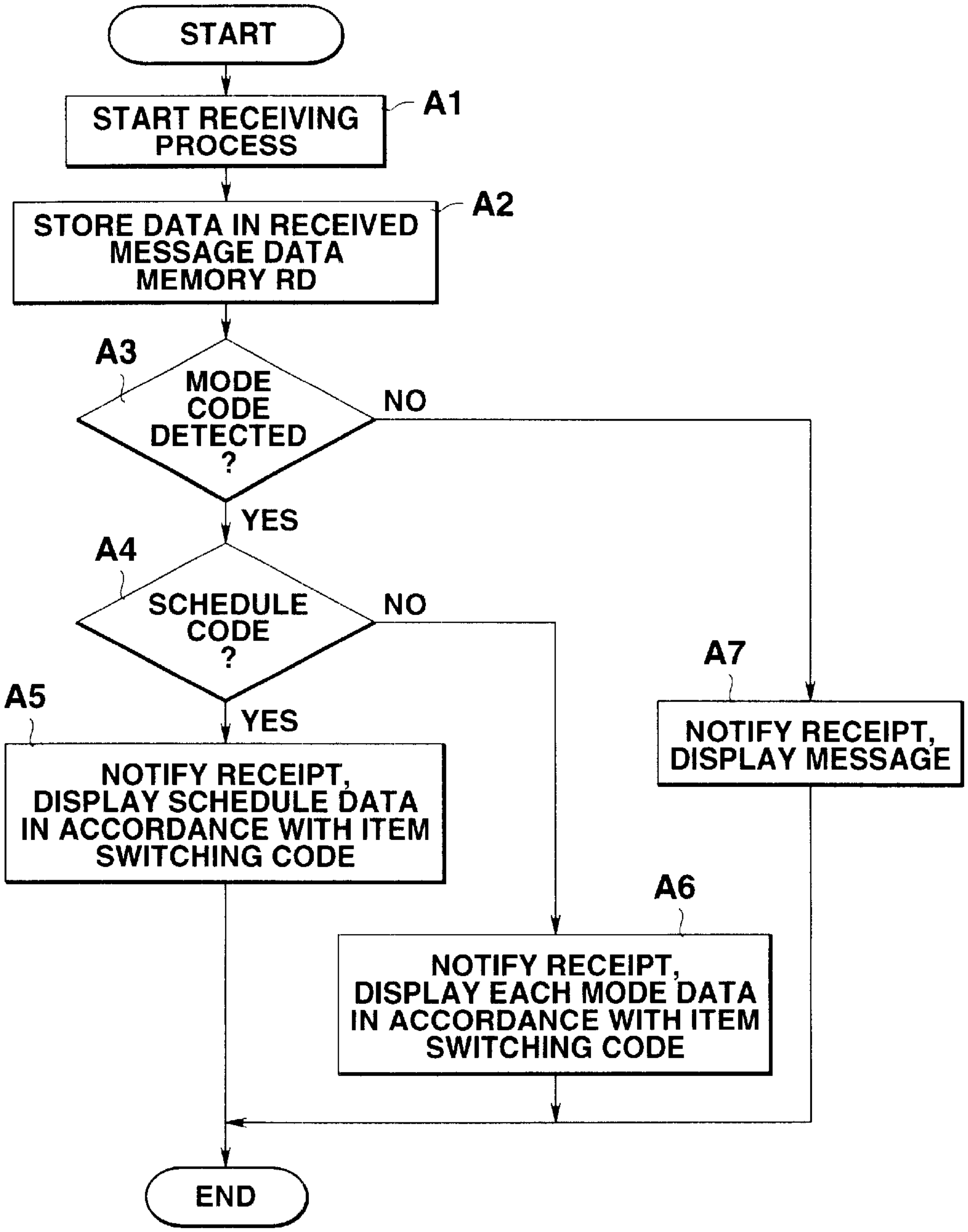
FIG. 15 is a flow chart of the contents of the data receiving operation according to the embodiment of the present invention.

FIG. 15 is a diagram mainly showing the contents of a receiving process which is performed by the control unit 25 when schedule data has been received. The description will be made with regard to the operation of the electronic notebook 1B which has received message data from the electronic notebook 1A.

The receiving-side electronic notebook 1B starts performing the receiving operation at the timing assigned thereto. Thus, the interleave process which has performed to the received data is suspended by the deinterleave circuit 27. Then, the electronic notebook 1B stores data in the buffer memory 28 (step Al).

Then, received data stored in the buffer memory 28 is temporarily stored in the received message data memory RD of the RAM 30 (step A2). Then, it is determined whether or not the mode code "] [n (n: 1 to 5)" described with reference to FIG. 7 is added to the leading end of data (step A3).

If it is determined that the mode code has been detected, the control unit 25 determines whether or not numeral "n" of the above-mentioned mode code is "2", that is, whether or not the mode code is a code indicating the schedule mode (step A4).

If the mode code is the code indicating the schedule mode, the control unit 25 operates the driver 31 to selectively operate any one of the loudspeaker unit 34, the vibrator 35 or the LED 36 which has been set to notify the receipt of the message by the buzzer sound, vibrations or light flickering. Moreover, the control unit 25 displays, on the display portion 12, received data, that is, schedule data stored in the received message data memory RD while line-feeding the same at the position of the item switching code "[ ]" inserted into data (step A5). Thus, the foregoing process is temporarily ended.

Figure 16:
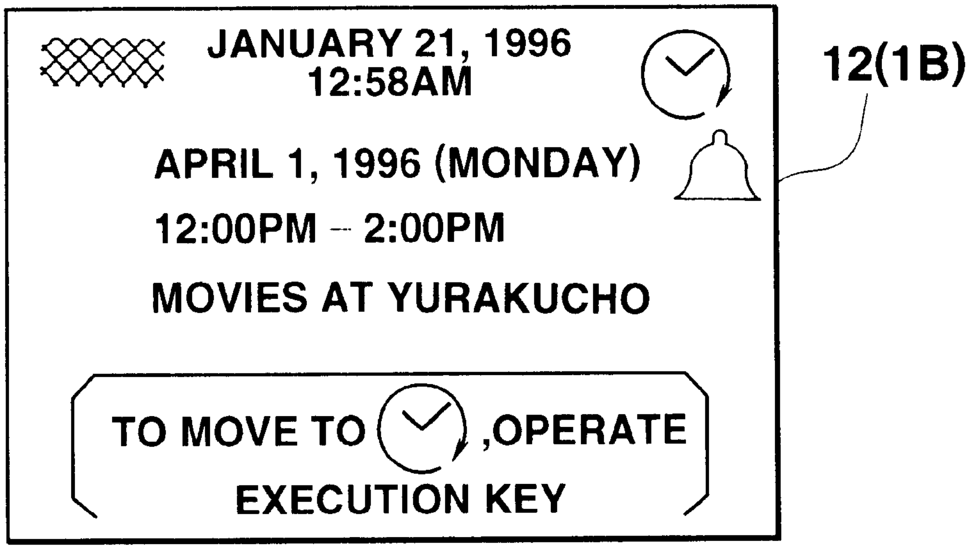
FIG. 16 is a diagram showing an example of schedule data screen when a receiving operation is performed by the apparatus according to the present invention.

FIG. 16 is a diagram showing an example of the contents of received schedule data which is displayed on the display portion 12. Time "Jan. 21, 1996 12:58 AM" and an icon indicating that received data is schedule data are displayed on the uppermost line of the display portion. Moreover, received schedule data is displayed on the second to fourth lines while being line-fed at the insertion position of the item switching code "[ ]".

Moreover, a guide message indicating that received data is transferred to and stored in the schedule data memory SD of the RAM 30 if the execute key **13*k* is operated is displayed on the lowermost line of the display portion 12**.

When the execute key **13*k* is operated in accordance with the guide display, a process similar to that performed when the execute key 13*k*** is operated in the received message display mode is performed. Therefore, the contents of the process are omitted from description.

If it is determined in step A4 that the mode code at the leading end of received message data is not the code indicating the schedule mode, the control unit 25 causes the driver 31 to selectively operate any one of the loudspeaker unit 34, the vibrator 35 or the LED 36, which has been set, to notify receipt of the message by buzzer sound, vibrations or light flickering. Moreover, received data stored in the received message data memory RD, that is, data in a mode except the schedule mode, is displayed on the display portion 12 at a line-feeding position in accordance with the included item switching code "[ ]" (step A6). Thus, the foregoing process is temporarily completed.

If the mode code has not been detected in step A3 from the leading end of received message data, the message data is not related to the mode but it is the message data for only a the message. Thus, the control unit 25 causes the driver 31 to selectively operate any one of the loudspeaker unit 34, the vibrator 35 or the LED 36, which has been set, to notify receipt of the message by buzzer sound, vibrations or light flickering. Moreover, received data stored in the received message data memory RD is allowed to remain when displayed on the display portion 12 (step A7). Thus, the foregoing process is temporarily completed.

The operation will now be described which is performed when the electronic notebook 1B has instructed the received message display mode in which received message data stored in the received message data memory RD of the RAM 30 is read and displayed.

Figure 17:
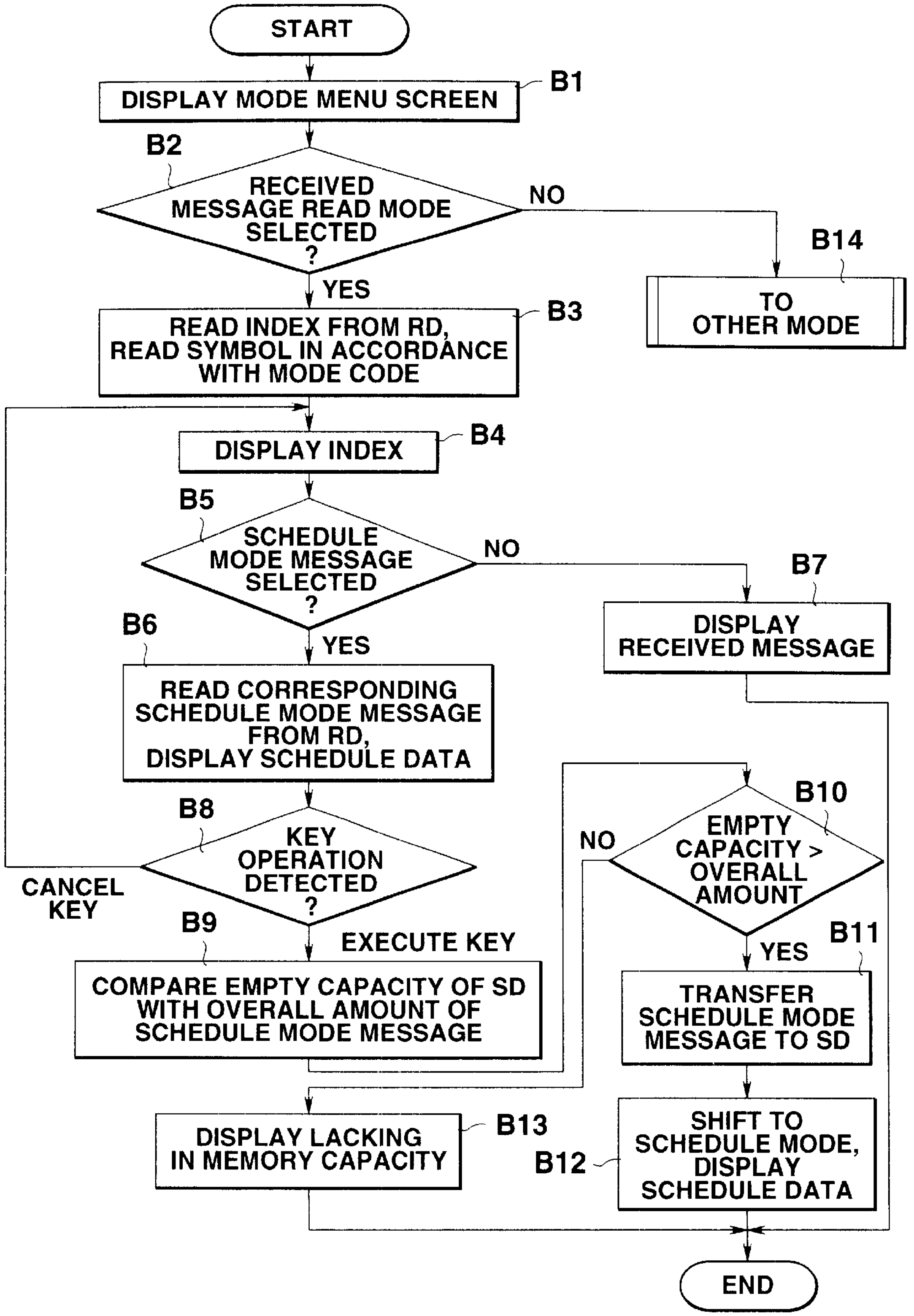
FIG. 17 is a flow chart of the process in a received message display mode according to the embodiment of the present invention.

FIG. 17 is a diagram mainly showing the operation which is performed by the control unit 25 in the received message display mode. In the receiving-side electronic notebook 1B, when the display-on key 13*a* has been operated in a state where the power supply has been turned off or when the menu key 13*d* has been operated, the mode menu screen shown in FIG. 11 is displayed on the display portion 12 (step B1).

When the cursor key 13*l* has been operated on the mode menu screen to move the menu cursor MC and the execute key 13*k* has been operated in a state where the icon of the received message display mode with the numeral "1" is in an inverted screen, it is determined that a mode for displaying the message data stored in the received message data memory RD of the RAM 30 has been selected in step B2 following step B1. Thus, each index portion of the plurality of stored the message data items, for example, seven digits are read from the received message data memory RD. If the leading end has a mode code, a corresponding display symbol is read from the mode code table MT of the ROM 29 in accordance with the mode code (step B3).

FIG. 18 is a diagram showing an example of the contents stored in the received message data memory RD of the RAM 30 of the electronic notebook 1B. Each stored the message data is provided with a confirmation flag indicating whether or not a user has confirmed when the message data has been received and storage address.

The message data having storage address "05" is formed of the mode code surrounded by a dashed line and the schedule data transmitted from the electronic notebook 1A with the item switching code "[ ]". Mode codes "] [2" indicating data in the schedule mode is provided to the leading end of the schedule data. Moreover, the item switching code "[ ]" is provided between items of data.

Therefore, the control unit 25 reads the index portion of each the message data, that is, a portion for seven digits, from the received message data memory RD of the RAM 30. Moreover, in accordance with the mode code "] [2" of schedule data having the storage address "05", the control unit 25 reads a display symbol of the schedule mode from the mode code table MT of the ROM 29.

The control unit 25 uses the read index portion of the message data and the mode display symbol to display the index on the display portion 12 (step B4).

Figure 19:
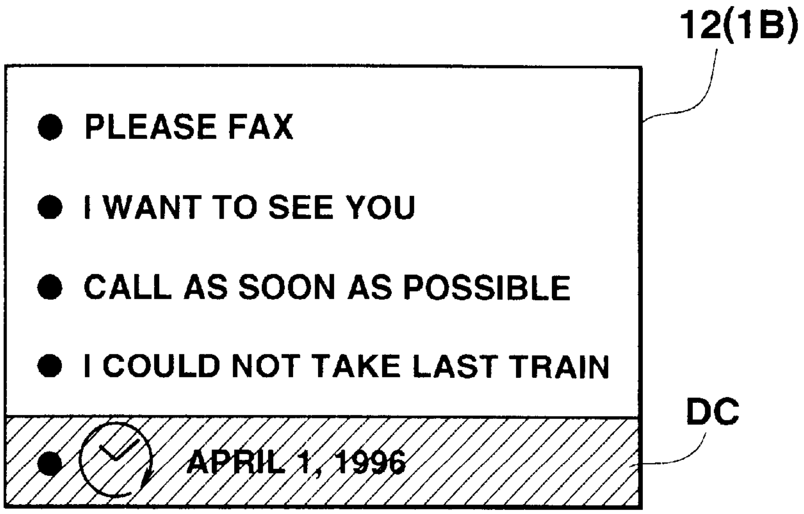
FIG. 19 is a diagram showing an example of an index screen in a received message display mode according to the embodiment of the present invention.

FIG. 19 is a diagram showing an example of a state where the index portions of the message data are read from the received message data memory RD shown in FIG. 18 and the same are displayed on the display portion 12. Usual the message data having no mode code is, by 7 digits or smaller, read from the received message data memory RD such that two characters of "kana" except "kanji", numerals and alphabets are counted as one digit, and then displayed on the display portion 12.

Schedule data is provided with the display symbol for the schedule mode read from the mode code table MT of the ROM 29 at the leading end when displayed. Moreover, only date data "19960401" is read from the received message data memory RD in accordance with a predetermined format so that display is performed such that "Apr. 1, 1996".

In a state where the indexes of received message data are being displayed, whether or not the message data of the schedule mode has been selected is determined (step B5).

When it is determined that the execute key 13*k* has been operated in a state where the message data of the schedule mode has been brought to an inverted screen as a result of the operation of the cursor key 13*l* as shown in FIG. 19, the message data of the schedule data is read from the received message data memory RD so as to be displayed on the display portion 12 (step B6).

In the display portion 12, receipt time "Jan. 21, 1996 12:58 AM" and an icon indicating a fact that received data is schedule data are displayed at the uppermost position, as shown in FIG. 16. Moreover, schedule data supplied from the electronic notebook 1A are displayed on the second to the fourth lines with line-fed on the basis of the item switching code "[ ]".

Moreover, a guide message is displayed on the lowermost line in the display portion 12 such that operation of the execute key 13*k* enables the received data to be, as it is, transferred and stored in the schedule data memory SD of the ROM 29.

In a stat e where received message data of the schedule mode i s being displayed, whether or not the execute key 13*k* or the cancel key 13*j* has been operated is detected (step B7).

If the execute key 13*k* has been operated, it means that confirmation to set received message data of the schedule mode to the schedule data memory SD of the own RAM 30 as schedule data has been performed. Thus, an empty capacity of the schedule data memory SD and the overall quantity of the message data which must be stored are compared with each other (step B9) to determine whether or not the empty capacity of the schedule data memory SD is larger than the overall quantity of the message data, that is, whether or not the message data can be stored in the schedule data memory SD as it is (step B10).

If it is determined that the empty capacity of the schedule data memory SD is larger than the overall quantity, the message data can be stored as it is. Therefore, the message data is transferred to the schedule data memory SD so as to be stored. On the other hand, the message data of the schedule mode is deleted from the received message data memory RD (step B11). Then, the mode is automatically shifted from the received message display mode to the schedule mode. Schedule data which has been newly stored in the schedule data memory SD is displayed on the display portion 12 to confirm that the message data has been registered as schedule data (step B12). Thus, the process shown in FIG. 17 is completed.

Figure 20:
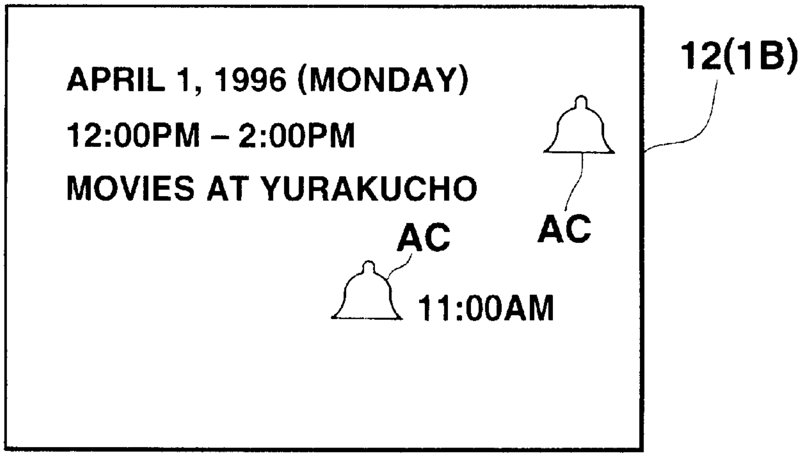
FIG. 20 is a diagram showing an example of schedule data screen in the received message display mode according to the embodiment of the present invention.

FIG. 20 is a diagram showing an example of a state of display on the display portion 12 of the electronic notebook 1B in the above-mentioned state. Similarly to FIG. 13, facts that "Movies at Yurakucho" has been received as schedule data at "12:00 PM to 14:00 PM" on "Apr. 1, 1996 (Monday)" and an alarm has been set at "11:00 AM" are displayed with two bell icons AC.

If it is determined in step B10 that the empty capacity of the schedule data memory SD is not more than the overall quantity of the message data and that the message data cannot be stored in the schedule data memory SD as it is, the empty capacity of the schedule data memory SD is too small. Therefore, a fact that transfer of the message data cannot be performed is displayed on the display portion 12 with a predetermined guide message (step B13). Thus, the process shown in FIG. 17 is completed.

Figure 21:
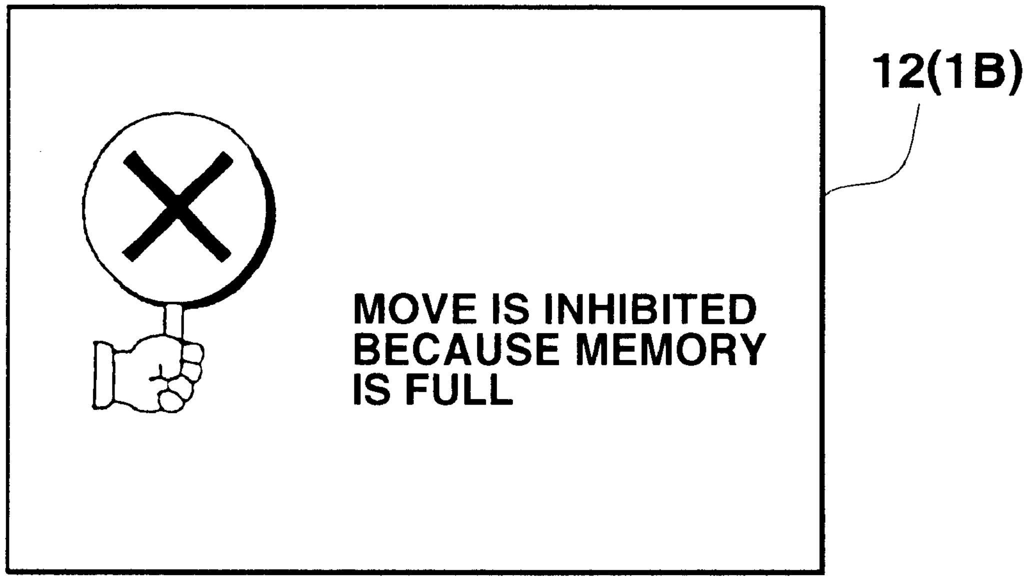
FIG. 21 is a diagram showing a screen in the received message display mode according to the embodiment of the present invention.

FIG. 21 is a diagram showing an example of a state of display on the display portion 12 in the foregoing state. As shown in FIG. 21, a display symbol in the form of a hand having a plate in which mark "×" is written and a guide message "Move is inhibited because memory is full" is displayed to urge the user of the electronic notebook 1B to recognize a necessity of arranging the schedule data memory SD if the received message data is important to be stored in the schedule data memory SD as the user's schedule data.

If it is determined in step B8 that the execute key 13*k* is not operated but the cancel key 13*j* has been operated, it means a confirmation that the received message data of the schedule mode is not required to be stored in the schedule data memory SD of the own electronic notebook as schedule data. Therefore, the operation is returned from the state where the message data is being displayed to a state where the indexes are displayed in step B4.

If it is determined in step B5 that the message data except the schedule mode has been selected in a state where the indexes of the received message data are being displayed, the selected the message data is, as it is, read from the received message data memory RD and displayed on the display portion 12 (step B7). Thus, the process shown in FIG. 17 is completed.

If it is determined in step B2 that a mode except the received message display mode has been selected from the mode menu screen, a process corresponding to the selected mode is performed as described later (step B14).

The foregoing embodiment has been described in which the transmission-side electronic notebook 1A selects schedule data stored in the schedule data memory SD of the RAM 30 to transmit the same as the message data. On the other hand, the receiving-side electronic notebook 1B is operated such that the execute key 13*k* is operated when receipt of the message data has been notified or the received message display mode has been set. Thus, the message data is transferred to the schedule data memory SD of the RAM 30 as the own schedule data. However, data in other modes can be transmitted as the message data and the receiving side is able to store it in a memory region in the corresponding mode by a simple key operation, as well as schedule data in the schedule data memory SD corresponding to the schedule mode.

The operation for transmitting/receiving data in each mode will now be described.

FIG. 22 is a diagram following FIG. 18 and showing contents stored in the received message data memory RD of the RAM 30 of the receiving-side electronic notebook 1B.

The message data at the storage address "06" is formed of a mode code surrounded by a dashed line and address-book data supplied from the electronic notebook 1A in accordance with the item switching code. Mode code "] [3" indicating that data is address mode data is provided for the leading end of the message data. Moreover, twelve item switching codes "[ ]" respectively are provided between items in data.

The message data at the storage address "07" is memorandum data supplied from the electronic notebook 1A. Mode code "] [4" indicating that data is memorandum mode data is provided for the leading end of the message data. Only one item switching code "[ ]" is provided between items of data.

The message data at the storage address "08" is group talk data supplied from the electronic notebook 1A. Mode code "] [1" indicating group talk data is provided for the leading end of the message data. Two item switching codes "[ ]" are provided between items of data.

The message data at the storage address "09" is "To Do" data supplied from the electronic notebook 1A. Mode code "] [5" indicating "To Do" data is provided for the leading end of the message data. Three item switching codes "[ ]" are provided between items of data.

When the received message display mode has been selected from the mode menu screen in a state where the above-mentioned contents have been stored in the received message data memory RD, the index portions of respective message data in the received message data memory RD are read as shown in FIG. 17. Moreover, corresponding display symbols are read from the mode code table MT of the ROM 29 in accordance with the mode codes added to the leading ends (step B3). The read index portion of the message data and the display symbols of the mode codes are used so that indexes are displayed as shown in FIG. 23 (step B4).

Figure 23:
FIG. 23 is a diagram showing an example of an index screen in the received message display mode according to the embodiment of the present invention.

That is, in a case shown in FIG. 23, display symbols of the schedule mode, the address book mode, the memorandum mode, the group talk mode and the "To Do" mode are displayed at the leading ends of the indexes of the message data items.

The operation will now be described which is performed when the transmission-side electronic notebook 1A selects and transmits data in each mode in order to cause the foregoing the message data to be stored in the received message data memory RD of the RAM 30 of the receiving-side electronic notebook 1B.

FIG. 24 is a diagram showing an example of the contents stored in the address-book data memory DB of the RAM 30 of the electronic notebook 1A. A plurality of sets of address-book data items are stored each consisting of name which is the first item, reading which is the second item, telephone number which is the third item, the type of the pager receiver which is the fourth item, the call number of the pager which is the fifth item, address which is the sixth item, an icon which is the seventh item and another information item which is the eighth item.

Figure 25:
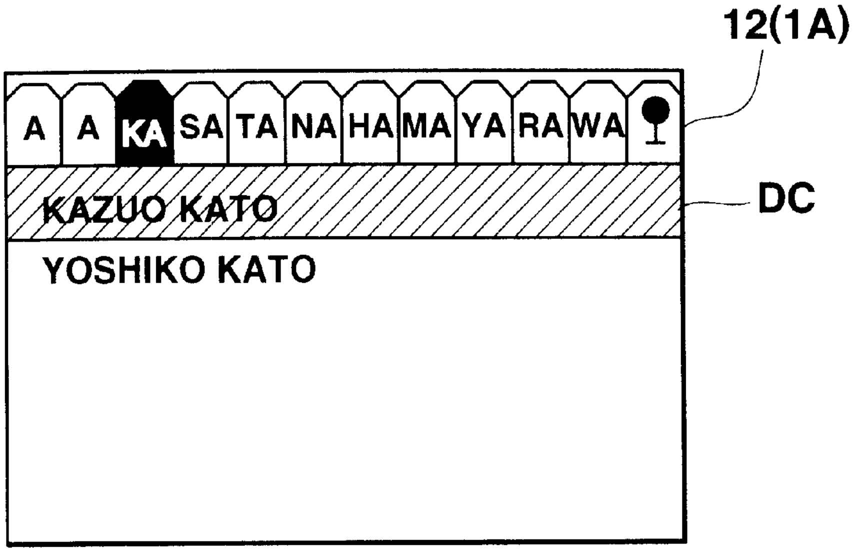
FIG. 25 is a diagram showing an example of a screen when address-book data is transmitted from the apparatus according to the embodiment of the present invention.

In the pager receiver 1A having the contents stored in the address-book data memory DB, when the cursor key 13*l* has been operated to select the address book mode having numeral "6" from the mode menu screen and then the execute key 13*k* has been operated, index portions of the address-book data as shown in FIG. 25 are displayed on the display portion 12.

FIG. 25 is a diagram showing an example of indexes in the address book displayed on the display portion 12. A fact that the first letter of address-book data which is being displayed on the first line belongs to "k" letter group is displayed. Moreover, the index portions of the address book mode read from the address-book data memory DB, which are names in this case, are displayed on the second and following lines.

Referring to FIG. 25, name "Kazuo Kato" has been brought to an inverted screen state by the data cursor DC by operating the cursor key 13*l*. When the execute key 13*k* is operated in the foregoing state, the operation is detected so that address-book data is read from the address-book data memory DB so as to be displayed on the display portion 12.

Figure 26:
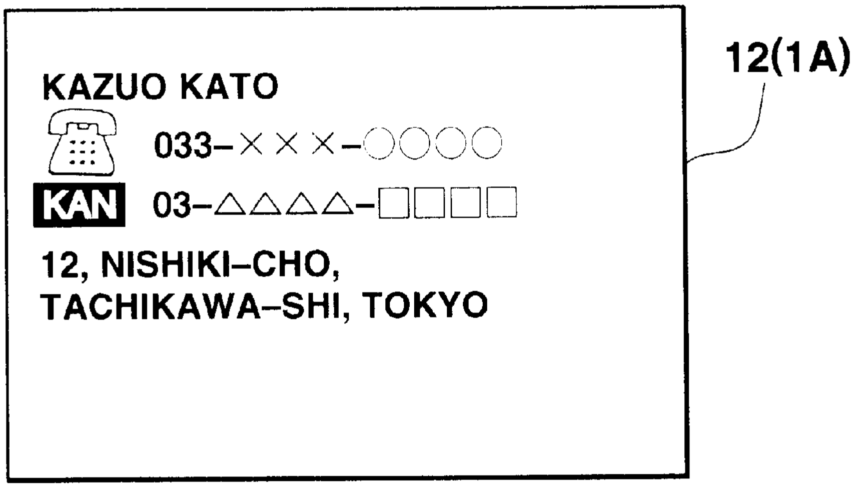
FIG. 26 is a diagram showing an example of a screen when address-book data is transmitted from the apparatus according to the embodiment of the present invention.

FIG. 26 is a diagram showing an example of a state of display on the display portion 12. Name is displayed on the first line, the icon of a telephone set and telephone number are displayed on the second line, an inverted letter of "Kan" corresponding to the type of the pager receiver and call number of the pager are displayed on the third line and address and so forth are displayed on the fourth and fifth lines.

When the call number key 13*i* is operated in the foregoing state, names are read from the contents stored in the address-book data memory DB of the RAM 30 in order to select the receiving-side apparatus so as to be displayed on the display portion 12. Since the process from the selection of the receiving-side apparatus to the transmission operation is similar to the operation which is performed when schedule data is transmitted, the similar process is omitted from description.

Figure 27:
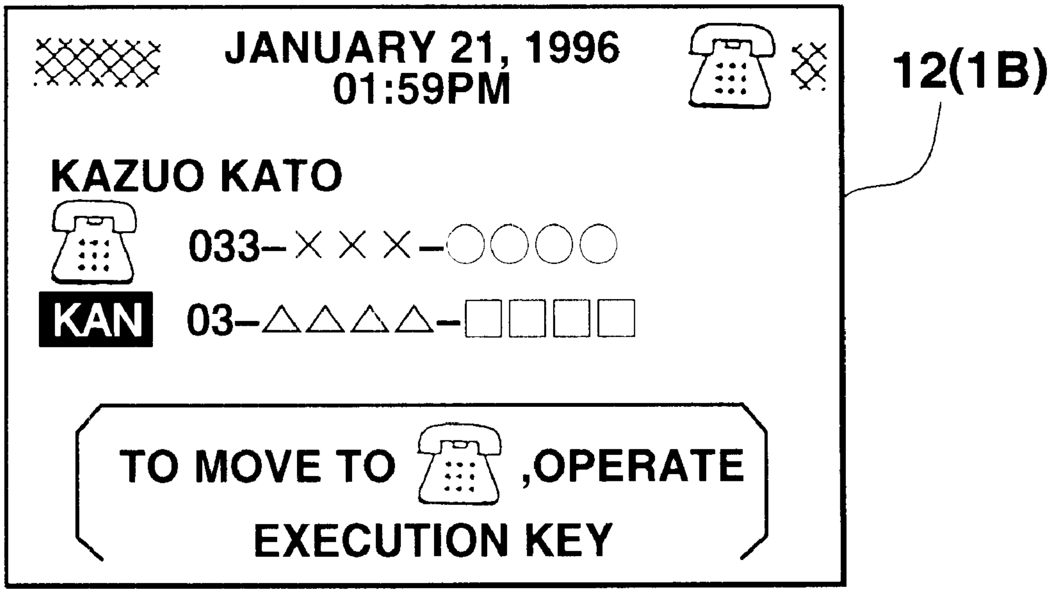
FIG. 27 is a diagram showing an address-book data screen in the received message display mode according to the embodiment of the present invention.

After the electronic notebook 1B has received address-book data, contents as shown in FIG. 27 are displayed when data has been supplied or when address-book data has been selected in a state of display of the indexes in the received message display mode shown in FIG. 23.

That is, in a case shown in FIG. 27, time of receipt "Jan. 21, 1996 01:59 PM" and the icon indicating that received data is address-book data are displayed on the uppermost line. Moreover, a portion of address-book data supplied from the electronic notebook 1A is displayed on the second to fourth lines while being line-fed to correspond the item switching code Moreover, a guide message is displayed on the lowermost line of the display portion 12, the guide message indicating that operation of the execute key 13*k* enables the received message to be, as it is, transferred and stored in the address-book data memory DB of the ROM 29.

If the execute key 13*k* has been operated in accordance with the guide message in the foregoing state where the received message data in the address book mode is displayed, it means a fact that the received message data in the address book mode is stored by the user of the electronic notebook 1B in the address-book data memory DB of the own RAM 30 as address-book data.

Therefore, it is confirmed that the message data can be stored as a result of the comparison between the empty capacity of the address-book data memory DB and the overall quantity of the message data. Then, the message data is transferred and stored in the address-book data memory DB. On the other hand, the message data in the corresponding address book mode is deleted from the received message data memory RD. Then, the mode is, as it is, shifted from the received message display mode to the address book mode. Then, address-book data, which has been newly stored in the address-book data memory DB, is displayed on the display portion 12 similarly to the case shown in FIG. 26 to confirm that the message data has been registered as address-book data.

Figure 28:
FIG. 28 is a diagram showing an example of the contents stored in the memorandum data memory MD shown in FIG. 8.

FIG. 28 is a diagram showing an example of the contents stored in the memorandum data memory MD of the RAM 30 of the electronic notebook 1A. A plurality of sets of memorandum data items are stored while being provided with storage addresses, each set being composed of the contents of the memorandum which are the first item and an icon which is the second item.

By arbitrarily setting line feeding codes, the character strings of the contents of the memorandum of the first item are listed when it is displayed.

When the memorandum mode having numeral "7" has been selected from the mode menu screen by operating the cursor key 13*l* of the electronic notebook 1A having the memorandum data memory MD storing the contents and then the execute key 13*k* has been operated, index portions of respective memorandum data items are read from the memorandum data memory MD so as to be displayed on the display portion 12.

When the execute key 13*k* has been operated in a state where the index portion of memorandum data at the storage address "01" shown in FIG. 28 has been brought to an inverted screen state by the data cursor DC as a result of the operation of the cursor key 13*l*, memorandum data is read from the memorandum data memory MD so as to be displayed on the display portion 12.

Figure 29:
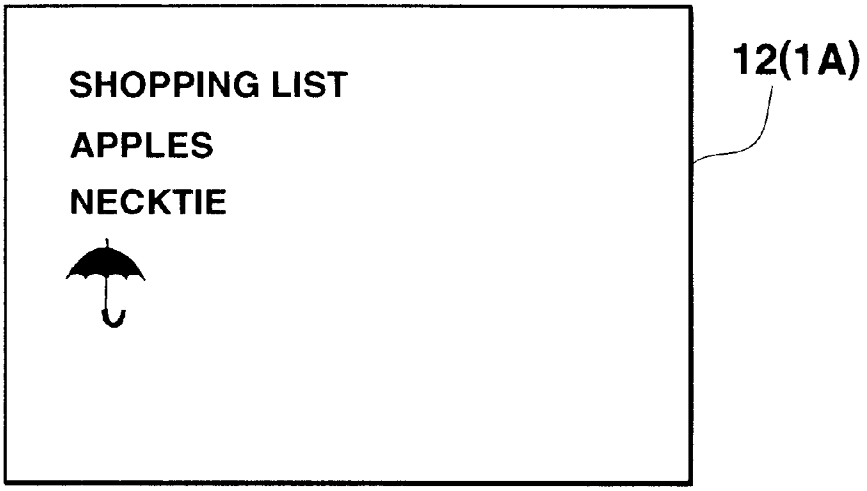
FIG. 29 is a diagram showing an example of a memorandum data screen when memorandum data is transmitted from the apparatus according to the embodiment of the present invention.

FIG. 29 is a diagram showing an example of display on the display portion 12. The contents of the memorandum are displayed on the first to third lines and an icon is displayed on the fourth line.

When the call number key 13*i* is operated in the foregoing state of display, names are read from the contents stored in the address-book data memory DB of the RAM 30 in order to select the receiving-side apparatus so as to be displayed on the display portion 12 in the form of a list. Since the process to be performed from the selection of the receiving-side apparatus to the transmission is similar to the process which is performed when schedule data or address-book data is transmitted, the similar process is omitted from description.

Figure 30:
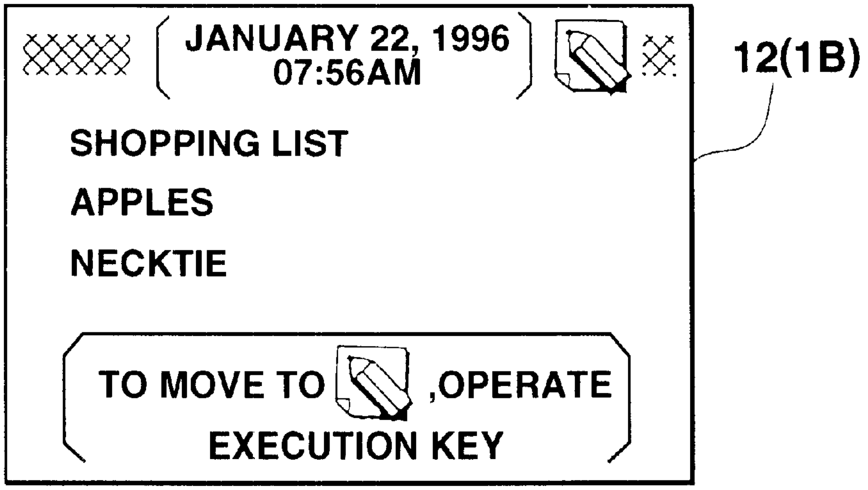
FIG. 30 is a diagram showing an example of a memorandum data screen in the received message display mode according to the embodiment of the present invention.

In the electronic notebook 1B which has received memorandum data, display as shown in FIG. 30 is performed when memorandum data has been supplied or when memorandum data has been selected in the display state of the indexes in the received message display mode shown in FIG. 23.

In the case shown in FIG. 30, time of receipt "Jan. 22, 1996 07:56 AM" and an icon indicating received data is memorandum data are displayed on the uppermost line. A portion of memorandum data supplied from the pager receiver 1A is line-fed corresponding to the line feeding code in the contents of the memorandum so as to be displayed on the second to fourth lines.

Moreover, a guide message indicating that operation of the execute key 13*k* enables the received message to be, as it is, transferred and stored in the memorandum data memory MD of the ROM 29 is displayed on the lowermost line in the display portion 12.

If the execute key 13*k* has been operated in accordance with the guide message in the foregoing state where the received message data in the memorandum mode is being displayed, it is confirmed that the received message data in the memorandum mode is stored in the memorandum data memory MD of the RAM 30 as memorandum data.

Therefore, it is confirmed that the message data can be stored as a result of the comparison performed between the empty capacity of the memorandum data memory MD and the overall quantity of the message data. Then, the message data is transferred and stored in the memorandum data memory MD. On the other hand, the message data in the memorandum mode is deleted from the received message data memory RD. Then, the mode is, as it is, automatically shifted from the received message display mode to the memorandum mode. Memorandum data, which has been newly stored in the memorandum data memory MD, is displayed on the display portion 12 similarly to the case shown in FIG. 29. Thus, a fact that the message data has been registered as memorandum data is confirmed.

Figures 31, 32:
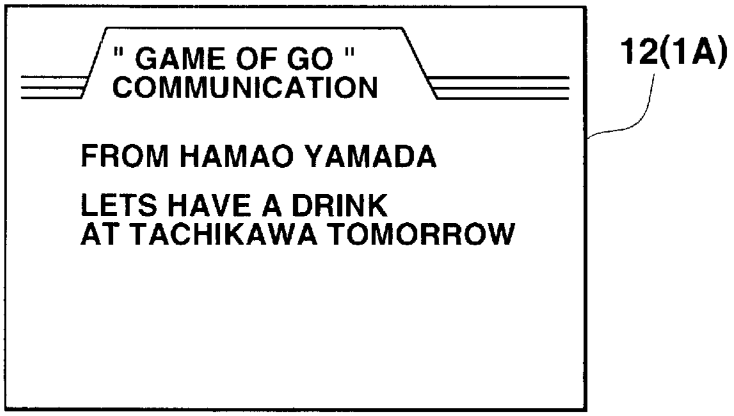
FIG. 31 is a diagram showing an example of the contents stored in the group talk memory GT shown in FIG. 8.
FIG. 32 is a diagram showing an example of a screen when group talk data is transmitted from the apparatus according to the embodiment of the present invention.

FIG. 31 is a diagram showing an example of the contents stored in the group talk memory GT of the RAM 30 of the electronic notebook 1A. A plurality of sets of group talk data are stored while being provided with storage addresses, each set consisting of file name, which is the first item, a sender name, which is the second item and the contents of the message, which are the third item.

In the pager receiver 1A having the group talk memory GT storing the above contents, when the group talk mode having numeral "3" has been selected from the mode menu screen by operating the cursor key 13*l* and then the execute key 13*k* has been operated, file name, which is the first item of each group talk data is, as an index portion, read from the group talk memory GT so as to be displayed on the display portion 12.

When the execute key 13*k* is operated in a state where the index portion of an arbitrary group talk data, for example, group talk data at the storage address "01" shown in FIG. 31 has been brought to the inverted screen state by the data cursor DC, group talk data is read from the group talk memory GT so as to be displayed on the display portion 12.

FIG. 32 is a diagram showing a state of display on the display portion 12. File name which is the first item is displayed on the first line, name of the sender which is the second item is displayed on the second line and contents of the message, which are the third item, are displayed on the third to fourth lines.

When the call number key 13*i* is operated in the above-mentioned display state, names are read from the contents stored in the address-book data memory DB of the RAM 30 in order to select the receiving-side apparatus so as to be displayed on the display portion 12 as a list. Since the process which is performed from the selection of the receiving-side apparatus to the transmission of data is similar to the process which is performed when the schedule data or the address-book data is transmitted, the similar process is omitted from description.

Figure 33:
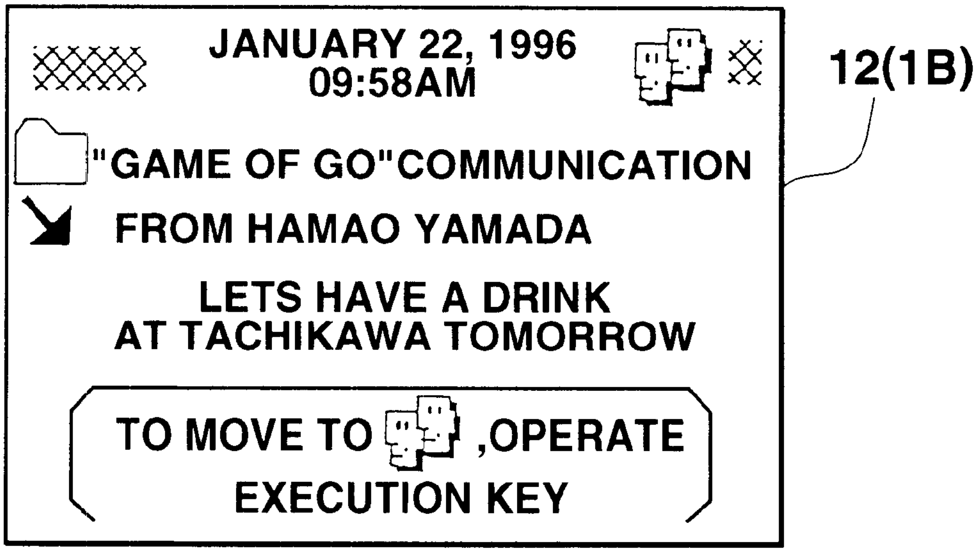
FIG. 33 is a diagram showing a group talk data screen in the received message display mode according to the embodiment of the present invention.

In the electronic notebook 1B which has received group talk data, display as shown in FIG. 33 is performed when group talk data has been supplied or when group talk data has been selected in the display state of the indexes in the received message display mode shown in FIG. 23.

That is, in the case shown in FIG. 33, time of receipt "Jan. 22, 1996 09:58 AM" and an icon indicating that received data is group talk data are displayed on the uppermost line. Moreover, a portion of group talk data supplied from the electronic notebook 1A is line-fed in accordance with the item switching code when group talk data is displayed on the second to fourth lines.

A guide message is displayed on the lowermost line in the display portion 12, the guide message indicating a fact that the operation of the execute key 13*k* enables the foregoing received message to be transferred and stored in the group talk memory GT of the ROM 29 as it is.

If the execute key 13*k* is operated in accordance with the guide message in the state where received message data in the group talk mode is being displayed, it means that the user of the electronic notebook 1B confirms that the received message data in the group talk mode is stored in the group talk memory GT of the RAM 30 as group talk data.

Therefore, it is confirmed that the message data can be stored as a result of a comparison performed between the empty capacity of the group talk memory GT and the overall quantity of the message data. Then, the message data is transferred and stored in the group talk memory GT. On the other hand, the message data of the group talk mode is deleted from the received message data memory RD. Then, the mode is, as it is, automatically shifted from the received message display mode to the group talk mode. Group talk data, which has been newly stored in the group talk memory GT, is displayed on the display portion 12 similarly to the case shown in FIG. 32. Thus, a fact that the message data has been registered as group talk data is confirmed.

Figure 34:
FIG. 34 is a diagram showing an example of the contents stored in the "To Do" data memory TD shown in FIG. 8.

FIG. 34 is a diagram showing an example of the contents stored in the "To Do" data memory TD of the RAM 30 of the pager receiver 1A. A plurality of sets of "To Do" data are stored while being provide with storage addresses, each set consisting of a check state flag which is the first item, the contents of "To Do" which is the second item, an icon which is the third item and check time which is the fourth item.

In the pager receiver 1A having the "To Do" data memory TD storing the above contents, when the "To Do" mode having numeral "8" has been selected by operating the cursor key 13*l* from the mode menu screen and then the execute key 13*k* has been operated, the contents of "To Do" which is the second item of each "To Do" data are, as an index portion, read from the "To Do" data memory TD so as to be displayed on the display portion 12.

When the execute key 13*k* has been operated in a state where the index portion of an arbitrary "To Do" data, for example, "To Do" data at the storage address "01" shown in FIG. 34 has been brought to the inverted screen state by the data cursor DC operated by the cursor key 13*l*, "To Do" data is read from the "To Do" data memory TD so as to be displayed on the display portion 12.

Figure 35:
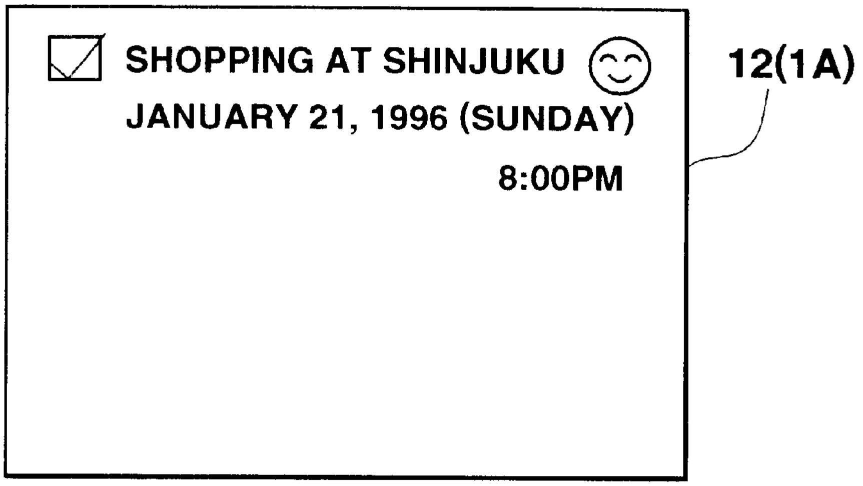
FIG. 35 is a diagram showing an example of a screen when "To Do" data is transmitted from the apparatus according to the embodiment of the present invention.

FIG. 35 is a diagram showing an example of a state of display on the display portion 12. A check symbol corresponding to the check state flag which is the first item and the contents of "To Do" which is the second item are displayed on the first line and check time which is the fourth item is displayed on the second line.

When the call number key 13*i* is operated in the foregoing display state, names are read from the contents stored in the address-book data memory DB of the RAM 30 in order to select the receiving-side apparatus so as to be displayed on the display portion 12 as a list. The process which is performed form the selection of the receiving-side apparatus to the transmission of the data is similar to the operation which is performed when schedule data, address-book data or group talk data is transmitted. Therefore, the similar process is omitted from description.

In the electronic notebook 1B which has received "To Do" data, display as shown in FIG. 33 is performed when "To Do" data has been supplied or when "To Do" data has been selected in the state of display of the indexes in the received message display mode shown in FIG. 23.

Figure 36:
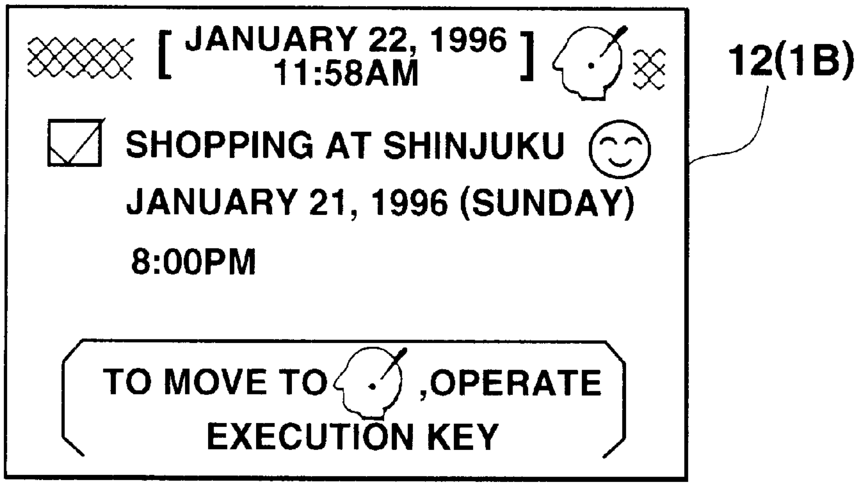
FIG. 36 is a diagram showing "To Do" data screen in the received message display mode according to the embodiment of the present invention.

In the case shown in FIG. 36, receipt time "Jan. 22, 1996 11:58 AM" and an icon indicating a fact that received data is "To Do" data are displayed on the uppermost position. Moreover, "To Do" data supplied from the electronic notebook 1A is displayed on the second to fourth lines while being line-fed in accordance with the item switching code.

Moreover, a guide message is displayed on the lowermost line in the display portion 12, the guide message indicating a fact that operation of the execute key 13*k* enables the received message to be, as it is, transferred and stored in the "To Do" data memory TD.

If the execute key 13*k* has been operated in accordance with the guide message in the state where received message data in the "To Do" mode is being displayed, it means that the user of the electronic notebook 1B confirms that the received message data in the "To Do" mode is stored in the "To Do" data memory TD of the RAM 30 as "To Do" data.

Therefore, it is confirmed that "To Do" data can be stored as it is in accordance with a result of a comparison performed between the empty capacity of the "To Do" data memory TD and the overall quantity of the message data. Then, the message data is transferred and stored in the "To Do" data memory TD. On the other hand, the message data in the "To Do" mode in the "To Do" data memory TD is deleted. Then, the mode is automatically shifted from the received message display mode to the "To Do" mode. Then, "To Do" data, which has been newly stored in the "To Do" data memory TD, is displayed on the display portion 12 similarly to the case shown in FIG. 35 so that a fact that the message data has been registered as "To Do" data is confirmed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although according to the foregoing embodiment, the transmission data is converted into DTMF signal so as to be emitted from the loudspeaker unit 18 as sound, the present invention is not limited to this. The transmission data may be converted into infrared ray signal so as to be output and transmitted from the IR transmitting/receiver 14. Further, the transmission data may be output and transmitted from the connector 38. Although the foregoing embodiment is applied to the electronic notebook having the paging signal receiving function and the dial tone output function, the present invention is not limited to this. The present invention may, of course, be applied to a variety of electronic apparatuses, for example, digital portable telephones, transceivers, data communication terminals and the like, which perform wireless transmission.

According to one aspect of the present invention, the data transmitted from the transmission apparatus can be stored in a classified region on the storage means of the receiving-side apparatus to correspond to the attribute of data with a simple instruction operation for confirming received data so that data is shared.

According to another aspect of the present invention, user of this information management apparatus is able to transmit data of a type having an attribute regardless of the attribute.

According to still another aspect of the present invention, received data can be stored in a classified region on the storage means corresponding to the attribute of received data with a simple instruction operation for confirming the attribute of data.

According to still further aspect of the present invention, it is possible to transmit data having attribute to a specified receiving apparatus. Thus, data can be shared.

According to still further aspect of the present invention, it is possible to transmit data to another receiving apparatus through a public telephone network.

What is claimed is:

1. A communication system comprising:

a first information management apparatus comprising:

a first memory configured to classify and store data items in accordance with attributes of the data items, and a transmitter configured to transmit data items read from said first memory and the attributes of the data items; and a second information management apparatus comprising:

a second memory having plural storage areas and configured to classify and store data items in accordance with the attributes of the data items, a receiver configured to receive the data items and the attributes transmitted from said first information management apparatus, a display configured to display one of the data items received by said receiver and a guidance message, based on the attribute of said one of the data items, for indicating in which storage area of said second memory said one of the displayed data items is to be stored, an instruction issuing unit configured to issue a storing instruction, in response to a first manual operation by a user, for instructing that the data items displayed on said display be stored to said one of the plural storage areas of said second memory indicated by said guidance message and a canceling instruction, in response to a second manual operation by the user, for instructing that said one of the data items displayed on said display not be stored to said one of the plural storage areas of said second memory indicated by said guidance message; and a controller configured to store said one of the data items displayed on said display to said one of the plural storage areas of said second memory indicated by said guidance message in response to said storing instruction and to enable said display to display another one of the data items and a corresponding guidance message in response to said canceling instruction.

2. The communication system according to claim 1, wherein said first information management apparatus further comprises a selector configured to select a data item to be transmitted from among said plurality of data items stored in said first memory, wherein said transmitter reads a data item selected by said selector from said first memory and transmits a signal including the data item read from said first memory and an instruction code for specifying the attribute of the read data.

3. The communication system according to claim 1, wherein said transmitter converts, into a dial tone signal, the signal including data and the instruction code so as to sequentially transmit the signal.

4. The communication system according to claim 1, wherein said second information management apparatus comprises a third memory, including plural storage regions, configured to store the data items and the instruction code included in the signal received by said receiver; and wherein said display selectively displays desired data items among the data items stored in the third memory.

5. The communication system according to claim 1, wherein said memory controller comprises a comparator configured to compare an amount of a displayed data item with an amount of empty area of a classification area of said second memory corresponding to an attribute of the displayed data item, and wherein said memory controller stores the displayed data to the corresponding classification area if the amount of empty area of said second memory is larger than the amount of the displayed data item and informs a user of impossibility of storage of data if the amount of empty area of said second memory is not larger than the amount of the displayed data item.

6. The communication system according to claim 1, wherein said plurality of data items includes schedule data informing a user of the second information management apparatus of a schedule of a user of the first information management apparatus.

7. The communication system according to claim 1, wherein said plurality of data items includes address book data.

8. The communication system according to claim 1, wherein:

said receiver comprises a buffer memory configured to store the data items included in the received signal, and said memory controller transfers the data items stored in the buffer memory to the second memory in accordance with the storing instruction and erases the data items from the buffer memory.

9. The communication system according to claim 1, wherein:

said memory controller comprises a circuit configured to detect whether or not a remaining area of the second memory is insufficient for storing the displayed data item, and said display is configured to display a warning message when the remaining area of the second memory is insufficient for storing the displayed data item.

10. An information management apparatus receiving data items and corresponding attributes, the apparatus comprising:

a memory having plural storage areas and configured to classify and store data items in accordance with the attributes of the data items;

a display configured to display one of the received data items and a guidance message, based on the attribute of said one of the received data items, for indicating in which storage area of said memory said displayed one of the received data items is to be stored;

an instruction issuing unit configured to issue a storing instruction, in response to a first manual operation by a user, for instructing that said one of the data items displayed on said display be stored to said one of the plural storage areas of said memory indicated by said guidance message, and a canceling instruction, in response to a second manual operation by the user, for instructing that said one of the data items displayed on said display not be stored to said one of the plural storage areas of said memory indicated by said guidance message; and a controller configured to store said one of the data items displayed on said display to said one of the plural storage areas of said memory indicated by said guidance message in response to said storing instruction and to enable said display to display another one of the data items and a corresponding guidance message in response to said canceling instruction.

11. The information management apparatus according to claim 10, further comprising a transmitter configured to transmit a signal including data items read from said memory and an instruction code for specifying the attribute of the data items read from said memory.

12. The information management apparatus according to claim 11, wherein said transmitter converts into a dial tone signal, the signal which includes data items and the instruction code so as to sequentially transmit the signal.

13. The information management apparatus according to claim 10, further comprising a second memory including plural storage regions configured to store the data items and the instruction code included in the signal received by said receiver, and wherein said display selectively displays desired data items among the data items stored in the second memory.

14. The information management apparatus according to claim 10, wherein said memory controller comprises a comparator configured to compare an amount of a displayed data item with an amount of empty area of a classification area of said memory corresponding to an attribute of the displayed data item, and wherein said memory controller stores the displayed data to the corresponding classification area if the amount of empty area of said memory is larger than the amount of the displayed data item and informs a user of impossibility of storage of the displayed data item if the amount of empty area of said memory is not larger than the amount of storage necessary to store the displayed data item.

15. The information management apparatus according to claim 10, wherein said plurality of data items include schedule data informing a user of another information management apparatus of a schedule of a user of an own information management apparatus.

16. The information management apparatus according to claim 10, wherein said plurality of data items include address book data.

17. The information management apparatus according to claim 10, wherein:

said receiver comprises a buffer memory configured to store the data items included in the received signal, and said memory controller transfers the data items stored in the buffer memory to the second memory in accordance with the storing instruction and erases the data items from the buffer memory.

18. The information management apparatus according to claim 10, wherein:

said memory controller comprises a circuit configured to detect whether or not a remaining area of the second memory is insufficient for storing the displayed data item, and said display is configured to display a warning message when the remaining area of the second memory is insufficient for storing the displayed data item.

19. An information management apparatus receiving data items and attributes indicating kinds of data items, the apparatus comprising:

a first memory configured to store received data items and received attributes, each of the received attributes corresponding to a received data item;

a second memory having plural storage areas and configured to classify and store the received data items in accordance with the attributes of the received data items, a display device;

an index display configured to display indexes of the received data items stored in the first memory and display indexes of the received data items on said display device;

a selector configured to select one of the indexes displayed on said display device;

a data item display, when said selector selects one of the indexes, the data item display changes the display contents of said display device to one of the data items which corresponds to the selected index and a guidance message, based on the attribute of said one of the data items, for indicating in which storage area of said second memory said one of the data items is to be stored;

an instruction issuing unit configured to issue a storing instruction, in response to a first manual operation by a user, for instructing that said one of the data items corresponding to the selected index is to be stored to one of the plural storage areas of said second memory indicated by said guidance message, and a canceling instruction, in response to a second manual operation by the user, for instructing that said one of the data items corresponding to the selected index not be stored to said one of the plural storage areas of said second memory indicated by said guidance message;

a controller configured to store said one of the data items corresponding to the selected index to said one of the plural storage areas of said second memory indicated by said guidance message in response to said storing instruction and change the display contents of said display device to another one of the data items and a corresponding guidance message in response to said canceling instruction; and a confirmation display, when said controller stores said one of the data items corresponding to the selected index, the confirmation display changes the display contents of said display device to said one of the data items corresponding to the selected index.

20. The information management apparatus according to claim 19, wherein said controller comprises a comparator configured to compare an amount of said one of the data items corresponding to the selected index with an amount of an empty area of one of the plural storage areas of said second memory indicated by said guidance message and wherein said controller stores said one of the data items corresponding to the selected index if the amount of the empty area of said one of the plural storage areas of said second memory indicated by said guidance message is larger than the amount of said one of the data items corresponding to the selected index and informs the user of the impossibility of storage of data if the amount of the empty area of said one of the plural storage areas of said second memory indicated by said guidance message is not at least equal to the amount of said one of the data items corresponding to the selected index.

21. A method of managing information comprising the steps of:

receiving data items and attributes indicating kinds of data items;

storing received data items and received attributes in a first memory, each of the received attributes corresponding to a received data item;

classifying and storing the received data items in a second memory in accordance with the attributes of the received data items;

displaying indexes of the received data items stored in the first memory and displaying indexes of the received data items on a display device;

selecting one of the indexes displayed on said display device;

changing display contents of said display device to one of the data items which corresponds to the selected index and a guidance message, based on the attribute of said one of the data items, for indicating in which one of a plurality of storage areas of a memory said one of the data items is to be stored;

issuing a storing instruction, in response to a first manual operation by a user, for instructing that said one of the data items corresponding to the selected index be stored to one of the plural storage areas of said memory indicated by said guidance message, and a canceling instruction, in response to a second manual operation by the user, for instructing that said one of the data items corresponding to the selected index not be stored to said one of the plural storage areas of said second memory indicated by said guidance message;

storing said one of the data items corresponding to the selected index to said one of the plural storage areas of said second memory indicated by said guidance message in response to said storing instruction and changing the display contents of said display device to another one of the data items and a corresponding guidance message in response to said canceling instruction; and changing the display contents of said display device to said one of the data items corresponding to the selected index.

22. The method according to claim 21, further comprising the steps of:

comparing an amount of said one of the data items corresponding to the selected index with an amount of an empty area of one of the plural storage areas of said second memory indicated by said guidance message;

storing said one of the data items corresponding to the selected index if the amount of the empty area of said one of the plural storage areas of said second memory indicated by said guidance message is larger than the amount of said one of the data items corresponding to the selected index; and informing the user of the impossibility of storage of data if the amount of the empty area of said one of the plural storage areas of said second memory indicated by said guidance message is not at least equal to the amount of said one of the data items corresponding to the selected index.

* * * * *